United States Patent
Lu et al.

(10) Patent No.: US 12,111,502 B2
(45) Date of Patent: *Oct. 8, 2024

(54) HARDENED FIBER OPTIC CONNECTOR

(71) Applicant: CommScope Technologies LLC, Hickory, NC (US)

(72) Inventors: Yu Lu, Eden Prairie, MN (US); Randy Reagan, Morristown, NJ (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,561

(22) Filed: Jul. 24, 2023

(65) Prior Publication Data

US 2024/0027694 A1 Jan. 25, 2024

Related U.S. Application Data

(63) Continuation of application No. 17/809,973, filed on Jun. 30, 2022, now abandoned, which is a
(Continued)

(51) Int. Cl.
*G02B 6/38* (2006.01)

(52) U.S. Cl.
CPC ......... *G02B 6/3879* (2013.01); *G02B 6/3816* (2013.01); *G02B 6/3821* (2013.01);
(Continued)

(58) Field of Classification Search
CPC .. G02B 6/3879; G02B 6/3816; G02B 6/3821; G02B 6/3825; G02B 6/3869;
(Continued)

(56) References Cited

U.S. PATENT DOCUMENTS

| 2,950,338 A | 8/1960 | Taylor |
| 4,140,366 A | 2/1979 | Makuch et al. |
| (Continued) | | |

FOREIGN PATENT DOCUMENTS

| DE | 35 37 684 A1 | 4/1987 |
| DE | 10 2004 049 697 A1 | 4/2006 |
| (Continued) | | |

OTHER PUBLICATIONS

Delphi Connection Systems, "Harsh Environment Hermaphroditic Fiber Optic Connectors," 16 pages (© 2002).
(Continued)

*Primary Examiner* — John Bedtelyon
(74) *Attorney, Agent, or Firm* — Merchant & Gould P.C.

(57) ABSTRACT

The present disclosure relates to a fiber optic connector for use with a fiber optic adapter. The fiber optic connector includes a connector housing having an end defining a plug portion. A ferrule assembly is mounted at least partially within the connector housing. The ferrule assembly includes a ferrule located at the plug portion of the connector housing. A sealing member is mounted about an exterior of the connector housing for providing a seal between the connector housing and the adapter. The fiber optic connector further includes first and second separate retaining mechanism for retaining the fiber optic connector within the fiber optic adapter.

20 Claims, 18 Drawing Sheets

Related U.S. Application Data continuation of application No. 17/091,397, filed on Nov. 6, 2020, now Pat. No. 11,409,057, which is a continuation of application No. 16/402,472, filed on May 3, 2019, now Pat. No. 10,877,224, which is a continuation of application No. 15/498,697, filed on Apr. 27, 2017, now Pat. No. 10,338,323, which is a continuation of application No. 14/323,135, filed on Jul. 3, 2014, now Pat. No. 9,664,862, which is a continuation of application No. 12/333,509, filed on Dec. 12, 2008, now Pat. No. 8,770,862, which is a continuation of application No. 11/657,402, filed on Jan. 24, 2007, now Pat. No. 7,572,065.

(52) U.S. Cl.
CPC ......... *G02B 6/3825* (2013.01); *G02B 6/3869* (2013.01); *G02B 6/3877* (2013.01); *G02B 6/3887* (2013.01); *G02B 6/3888* (2021.05); *G02B 6/3893* (2013.01); *G02B 6/3894* (2013.01); *G02B 6/3889* (2013.01)

(58) Field of Classification Search
CPC .. G02B 6/3877; G02B 6/3887; G02B 6/3888; G02B 6/3893; G02B 6/3894; G02B 6/3889; G02B 6/38
See application file for complete search history.

(56) References Cited

U.S. PATENT DOCUMENTS

| | | |
|---|---|---|
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,279,467 A | 7/1981 | Borsuk et al. |
| 4,291,943 A | 9/1981 | Binek et al. |
| 4,339,171 A | 7/1982 | Makuch et al. |
| 4,354,731 A | 10/1982 | Mouissie |
| 4,447,120 A | 5/1984 | Borsuk |
| 4,448,478 A | 5/1984 | Matthews |
| 4,515,434 A | 5/1985 | Margolin et al. |
| 4,611,887 A | 9/1986 | Glover et al. |
| 4,615,581 A | 10/1986 | Morimoto |
| 4,648,688 A | 3/1987 | Ashman et al. |
| 4,684,205 A | 8/1987 | Margolin et al. |
| 4,687,291 A | 8/1987 | Stape et al. |
| 4,705,352 A | 11/1987 | Margolin et al. |
| 4,715,675 A | 12/1987 | Kevern et al. |
| 4,725,120 A | 2/1988 | Gnat |
| 4,787,706 A | 11/1988 | Cannon, Jr. et al. |
| 4,793,683 A | 12/1988 | Cannon, Jr. et al. |
| 4,805,980 A | 2/1989 | Mackenroth |
| 4,815,810 A | 3/1989 | Betzler et al. |
| 4,820,185 A | 4/1989 | Moulin |
| 4,846,564 A | 7/1989 | Caron et al. |
| 4,854,664 A | 8/1989 | McCartney |
| 4,902,238 A | 2/1990 | Iacobucci |
| 4,907,853 A | 3/1990 | Hiratsuka |
| 4,961,623 A | 10/1990 | Midkiff et al. |
| 4,964,688 A | 10/1990 | Caldwell et al. |
| 4,974,925 A | 12/1990 | Troutman et al. |
| 4,979,792 A | 12/1990 | Weber et al. |
| 5,016,968 A | 5/1991 | Hammond et al. |
| 5,042,901 A | 8/1991 | Merriken et al. |
| 5,076,656 A | 12/1991 | Briggs et al. |
| 5,096,276 A | 3/1992 | Gerace et al. |
| 5,101,463 A | 3/1992 | Cubukciyan et al. |
| 5,104,242 A | 4/1992 | Ishikawa |
| 5,121,458 A | 6/1992 | Nilsson et al. |
| 5,123,071 A | 6/1992 | Mulholland et al. |
| 5,129,023 A | 7/1992 | Anderson et al. |
| 5,134,677 A | 7/1992 | Leung et al. |
| 5,136,672 A | 8/1992 | Mulholland et al. |
| 5,142,601 A | 8/1992 | Shibata et al. |
| 5,157,749 A | 10/1992 | Briggs et al. |
| 5,166,995 A | 11/1992 | Briggs et al. |
| 5,202,942 A | 4/1993 | Collins et al. |
| 5,210,810 A | 5/1993 | Darden et al. |
| 5,212,752 A | 5/1993 | Stephenson et al. |
| 5,214,731 A | 5/1993 | Chang et al. |
| 5,214,732 A | 5/1993 | Beard et al. |
| 5,214,830 A | 6/1993 | Rozycki |
| 5,222,169 A | 6/1993 | Chang et al. |
| 5,259,052 A | 11/1993 | Briggs et al. |
| 5,263,105 A | 11/1993 | Johnson et al. |
| 5,265,181 A | 11/1993 | Chang |
| 5,267,342 A | 11/1993 | Takahashi et al. |
| 5,268,982 A | 12/1993 | Schaffer et al. |
| 5,271,080 A | 12/1993 | Hopper et al. |
| 5,274,729 A | 12/1993 | King et al. |
| 5,276,750 A | 1/1994 | Manning |
| 5,283,848 A | 2/1994 | Abendschein et al. |
| 5,283,853 A | 2/1994 | Szegda |
| 5,293,581 A | 3/1994 | DiMarco |
| 5,293,582 A | 3/1994 | Beard et al. |
| 5,313,540 A | 5/1994 | Ueda et al. |
| 5,315,679 A | 5/1994 | Baldwin et al. |
| 5,317,663 A | 5/1994 | Beard et al. |
| 5,359,688 A | 10/1994 | Underwood |
| 5,363,459 A | 11/1994 | Hultermans |
| 5,367,594 A | 11/1994 | Essert et al. |
| 5,390,270 A | 2/1995 | Hanzawa et al. |
| 5,392,373 A | 2/1995 | Essert |
| 5,394,497 A | 2/1995 | Erdman et al. |
| 5,408,557 A | 4/1995 | Hsu |
| 5,418,874 A | 5/1995 | Carlisle et al. |
| 5,428,703 A | 6/1995 | Lee |
| 5,450,517 A | 9/1995 | Essert |
| 5,465,313 A | 11/1995 | Belenkiy et al. |
| 5,475,782 A | 12/1995 | Ziebol |
| 5,481,634 A | 1/1996 | Anderson et al. |
| 5,548,677 A | 8/1996 | Kakii et al. |
| 5,569,050 A | 10/1996 | Lloyd |
| 5,577,145 A | 11/1996 | Musk |
| 5,590,229 A | 12/1996 | Goldman et al. |
| 5,633,970 A | 5/1997 | Olson et al. |
| 5,636,306 A | 6/1997 | Mock et al. |
| 5,638,474 A | 6/1997 | Lampert et al. |
| 5,668,906 A | 9/1997 | Yamamura et al. |
| 5,680,494 A | 10/1997 | Kaas |
| 5,682,450 A | 10/1997 | Patterson et al. |
| 5,682,451 A | 10/1997 | Lee et al. |
| 5,715,342 A | 2/1998 | Nodfelt et al. |
| 5,732,174 A | 3/1998 | Carpenter et al. |
| 5,751,874 A | 5/1998 | Chudoba |
| 5,778,122 A | 7/1998 | Giebel et al. |
| 5,806,175 A | 9/1998 | Underwood |
| 5,809,192 A | 9/1998 | Manning et al. |
| 5,862,289 A | 1/1999 | Walter et al. |
| 5,887,095 A | 3/1999 | Nagase |
| 5,892,870 A | 4/1999 | Fingler et al. |
| 5,896,477 A | 4/1999 | Stephenson et al. |
| 5,905,832 A | 5/1999 | Afille et al. |
| 5,909,526 A | 6/1999 | Roth et al. |
| 5,920,669 A | 7/1999 | Knecht et al. |
| 5,923,804 A | 7/1999 | Rosson |
| 5,923,805 A | 7/1999 | Anderson et al. |
| 5,940,559 A | 8/1999 | Noll |
| 5,946,436 A | 8/1999 | Takashi |
| 5,971,625 A | 10/1999 | Lu |
| 5,980,118 A | 11/1999 | Henningsson et al. |
| 5,984,532 A | 11/1999 | Tamaki et al. |
| 5,993,070 A | 11/1999 | Tamekuni et al. |
| 5,993,071 A | 11/1999 | Hultermans |
| 6,022,150 A | 2/2000 | Erdman et al. |
| 6,079,881 A | 6/2000 | Roth |
| 6,149,313 A | 11/2000 | Giebel et al. |
| 6,149,451 A | 11/2000 | Weber |
| 6,151,432 A | 11/2000 | Nakajima et al. |
| RE37,028 E | 1/2001 | Cooke et al. |
| 6,173,097 B1 | 1/2001 | Throckmorton et al. |
| 6,178,283 B1 | 1/2001 | Weigel |

(56) References Cited

U.S. PATENT DOCUMENTS

| | | |
|---|---|---|
| 6,179,475 B1 | 1/2001 | Takamatsu et al. |
| 6,179,482 B1 | 1/2001 | Takizawa et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,224,270 B1 | 5/2001 | Nakajima et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,261,006 B1 | 7/2001 | Selfridge |
| 6,264,374 B1 | 7/2001 | Selfridge et al. |
| 6,298,190 B2 | 10/2001 | Waldron et al. |
| 6,302,594 B1 | 10/2001 | Lee |
| 6,305,849 B1 | 10/2001 | Roehrs et al. |
| 6,347,888 B1 | 2/2002 | Puetz |
| 6,350,063 B1 | 2/2002 | Gilliland et al. |
| 6,357,929 B1 | 3/2002 | Roehrs et al. |
| 6,371,660 B1 | 4/2002 | Roehrs et al. |
| 6,379,054 B2 | 4/2002 | Throckmorton et al. |
| 6,419,399 B1 | 7/2002 | Loder et al. |
| 6,419,402 B1 | 7/2002 | Zimmel |
| 6,422,764 B1 | 7/2002 | Marrs |
| 6,427,035 B1 | 7/2002 | Mahony |
| 6,428,215 B1 | 8/2002 | Nault |
| 6,431,783 B2 | 8/2002 | Nakajima et al. |
| 6,435,732 B1 | 8/2002 | Asao et al. |
| 6,461,057 B2 | 10/2002 | Chen |
| 6,466,725 B2 | 10/2002 | Battey et al. |
| 6,496,641 B1 | 12/2002 | Mahony |
| 6,508,594 B1 | 1/2003 | Bruland |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,550,977 B2 | 4/2003 | Hizuka |
| 6,568,861 B2 | 5/2003 | Benner et al. |
| 6,575,640 B2 | 6/2003 | Connelly et al. |
| 6,579,014 B2 | 6/2003 | Melton et al. |
| 6,599,026 B1 | 7/2003 | Fahrnbauer et al. |
| 6,614,980 B1 | 9/2003 | Mahony et al. |
| 6,619,697 B2 | 9/2003 | Griffioen et al. |
| 6,619,859 B1 | 9/2003 | Minamino et al. |
| 6,625,375 B1 | 9/2003 | Mahony |
| 6,629,782 B2 | 10/2003 | McPhee et al. |
| 6,648,520 B2 | 11/2003 | McDonald et al. |
| 6,652,156 B2 | 11/2003 | Shinagawa et al. |
| 6,655,851 B1 | 12/2003 | Lee |
| 6,663,292 B1 | 12/2003 | Shirakawa |
| 6,668,127 B1 | 12/2003 | Mahony |
| 6,672,774 B2 | 1/2004 | Theuerkorn et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,705,764 B2 | 3/2004 | Shang |
| 6,714,710 B2 | 3/2004 | Gimblet |
| 6,729,773 B1 | 5/2004 | Finona et al. |
| 6,738,555 B1 | 5/2004 | Cooke et al. |
| 6,739,759 B1 | 5/2004 | Seeley |
| 6,767,141 B1 | 7/2004 | Dudek et al. |
| 6,783,281 B2 | 8/2004 | Cheng |
| 6,785,450 B2 | 8/2004 | Wagman et al. |
| 6,789,950 B1 | 9/2004 | Loder et al. |
| 6,809,265 B1 | 10/2004 | Gladd et al. |
| 6,816,662 B2 | 11/2004 | Doss et al. |
| 6,817,902 B2 | 11/2004 | Bernardi et al. |
| 6,821,024 B2 | 11/2004 | Bates, III |
| 6,832,856 B2 | 12/2004 | Chiu et al. |
| 6,848,836 B2 | 2/2005 | Ueda et al. |
| 6,854,895 B2 | 2/2005 | Coffey et al. |
| 6,863,446 B2 | 3/2005 | Ngo |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,918,703 B2 | 7/2005 | Chen et al. |
| 6,918,704 B2 | 7/2005 | Marrs et al. |
| 6,962,445 B2 | 11/2005 | Zimmel et al. |
| 6,974,265 B2 | 12/2005 | Chiu et al. |
| 7,008,116 B2 | 3/2006 | Kobayashi et al. |
| 7,011,454 B2 | 3/2006 | Caveney et al. |
| 7,025,507 B2 | 4/2006 | de Marchi |
| 7,035,513 B2 | 4/2006 | Mohler et al. |
| 7,044,650 B1 | 5/2006 | Tran et al. |
| 7,050,692 B2 | 5/2006 | Harlan et al. |
| 7,074,066 B2 | 7/2006 | Pepe |
| 7,076,144 B2 | 7/2006 | Loder et al. |
| 7,079,734 B2 | 7/2006 | Seddon et al. |
| 7,090,406 B2 | 8/2006 | Melton et al. |
| 7,090,407 B2 | 8/2006 | Melton et al. |
| 7,093,983 B2 | 8/2006 | Taira et al. |
| 7,111,990 B2 | 9/2006 | Melton et al. |
| 7,113,679 B2 | 9/2006 | Melton et al. |
| 7,114,857 B1 | 10/2006 | Kayner et al. |
| 7,121,731 B2 | 10/2006 | Weynant et al. |
| 7,121,732 B2 | 10/2006 | Pimpinella et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,175,352 B2 | 2/2007 | De Marchi |
| 7,178,990 B2 | 2/2007 | Caveney et al. |
| 7,182,522 B2 | 2/2007 | Sasaki et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,206,482 B2 | 4/2007 | Rhyne et al. |
| 7,207,727 B2 | 4/2007 | Tran et al. |
| 7,210,855 B2 | 5/2007 | Rossi et al. |
| 7,213,975 B2 | 5/2007 | Khemakhem et al. |
| 7,220,061 B2 | 5/2007 | De Marchi |
| 7,228,047 B1 | 6/2007 | Szilagyi et al. |
| 7,234,875 B2 | 6/2007 | Krowiak et al. |
| 7,234,876 B2 | 6/2007 | Ohtsu et al. |
| 7,234,877 B2 | 6/2007 | Sedor |
| 7,239,812 B2 | 7/2007 | Hung et al. |
| 7,244,066 B2 | 7/2007 | Theuerkorn |
| 7,255,486 B2 | 8/2007 | Cox et al. |
| 7,255,490 B2 | 8/2007 | Zhang et al. |
| 7,264,401 B2 | 9/2007 | Johnson |
| 7,264,402 B2 | 9/2007 | Theuerkorn et al. |
| 7,278,791 B2 | 10/2007 | Demaret et al. |
| 7,281,856 B2 | 10/2007 | Grzegorzewska et al. |
| 7,290,941 B2 | 11/2007 | Kiani et al. |
| 7,292,763 B2 | 11/2007 | Smith et al. |
| 7,302,152 B2 | 11/2007 | Luther et al. |
| 7,317,863 B2 | 1/2008 | Lu et al. |
| 7,326,087 B2 | 2/2008 | Gerlach et al. |
| 7,331,719 B2 | 2/2008 | Manning et al. |
| RE40,150 E | 3/2008 | Ishibashi et al. |
| 7,346,256 B2 | 3/2008 | Marrs et al. |
| 7,347,627 B2 | 3/2008 | Saito et al. |
| 7,369,738 B2 | 5/2008 | Larson et al. |
| 7,371,014 B2 | 5/2008 | Willis et al. |
| 7,380,992 B2 | 6/2008 | Kramer et al. |
| 7,460,750 B2 | 12/2008 | Durrant et al. |
| 7,463,803 B2 | 12/2008 | Cody et al. |
| 7,467,896 B2 | 12/2008 | Melton et al. |
| 7,481,585 B2 | 1/2009 | Scadden et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,677,814 B2 | 3/2010 | Lu et al. |
| 7,686,519 B2 | 3/2010 | Lu |
| 7,722,258 B2 | 5/2010 | Lu et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| RE42,522 E | 7/2011 | Zimmel et al. |
| 8,135,256 B2 | 3/2012 | Solheid et al. |

(56) References Cited

U.S. PATENT DOCUMENTS

| | | | |
|---|---|---|---|
| 8,202,008 B2 | 6/2012 | Lu et al. | |
| 8,414,196 B2 | 4/2013 | Lu et al. | |
| 8,770,862 B2 | 7/2014 | Lu et al. | |
| 8,808,842 B2 | 8/2014 | Avazzeri et al. | |
| 9,482,829 B2 | 11/2016 | Lu et al. | |
| 9,664,862 B2* | 5/2017 | Lu | G02B 6/3825 |
| 10,289,523 B2 | 5/2019 | Burton et al. | |
| 10,338,323 B2* | 7/2019 | Lu | G02B 6/3879 |
| 10,877,224 B2 | 12/2020 | Lu et al. | |
| 11,409,057 B2* | 8/2022 | Lu | G02B 6/3887 |
| 2001/0012428 A1 | 8/2001 | Nakajima et al. | |
| 2001/0036345 A1 | 11/2001 | Gimblet et al. | |
| 2002/0022392 A1 | 2/2002 | Below et al. | |
| 2002/0062978 A1 | 5/2002 | Sakabe et al. | |
| 2002/0081077 A1 | 6/2002 | Nault | |
| 2002/0164130 A1 | 11/2002 | Elkins, II et al. | |
| 2003/0063867 A1 | 4/2003 | McDonald et al. | |
| 2003/0081905 A1 | 5/2003 | Bethea et al. | |
| 2003/0094298 A1 | 5/2003 | Morrow et al. | |
| 2003/0095754 A1 | 5/2003 | Matsumoto et al. | |
| 2003/0095780 A1 | 5/2003 | Chang | |
| 2004/0017983 A1 | 1/2004 | Chen et al. | |
| 2004/0033028 A1 | 2/2004 | Cheng | |
| 2004/0038588 A1 | 2/2004 | Bernardi et al. | |
| 2004/0047566 A1 | 3/2004 | McDonald et al. | |
| 2004/0120663 A1 | 6/2004 | Lail et al. | |
| 2004/0223699 A1 | 11/2004 | Melton et al. | |
| 2004/0223720 A1 | 11/2004 | Melton et al. | |
| 2004/0228589 A1 | 11/2004 | Melton et al. | |
| 2005/0041928 A1 | 2/2005 | Zimmel et al. | |
| 2005/0064752 A1 | 3/2005 | Serino | |
| 2005/0100286 A1 | 5/2005 | Cox | |
| 2005/0117850 A1 | 6/2005 | Milette | |
| 2005/0215101 A1 | 9/2005 | Pepe | |
| 2005/0232553 A1 | 10/2005 | Holmquist | |
| 2005/0254757 A1 | 11/2005 | Ferretti, III et al. | |
| 2006/0056769 A1 | 3/2006 | Khemakhem et al. | |
| 2006/0088247 A1 | 4/2006 | Tran et al. | |
| 2006/0088248 A1 | 4/2006 | Tran et al. | |
| 2006/0089049 A1 | 4/2006 | Sedor | |
| 2006/0115219 A1 | 6/2006 | Mudd et al. | |
| 2006/0193562 A1 | 8/2006 | Theuerkorn | |
| 2007/0014522 A1 | 1/2007 | Yamaguchi et al. | |
| 2007/0025665 A1 | 2/2007 | Dean et al. | |
| 2007/0077010 A1 | 4/2007 | Melton et al. | |
| 2007/0127873 A1 | 6/2007 | Manning et al. | |
| 2007/0196053 A1 | 8/2007 | Kewitsch | |
| 2008/0044137 A1 | 2/2008 | Luther et al. | |
| 2008/0131132 A1 | 6/2008 | Solheid et al. | |
| 2008/0175541 A1 | 7/2008 | Lu et al. | |
| 2008/0175542 A1 | 7/2008 | Lu et al. | |
| 2008/0175546 A1 | 7/2008 | Lu et al. | |
| 2008/0273840 A1 | 11/2008 | Lu et al. | |
| 2008/0310796 A1 | 12/2008 | Lu | |
| 2009/0003772 A1 | 1/2009 | Lu et al. | |
| 2009/0041411 A1 | 2/2009 | Melton et al. | |
| 2009/0060423 A1 | 3/2009 | Melton et al. | |
| 2009/0148101 A1 | 6/2009 | Lu et al. | |
| 2009/0148102 A1 | 6/2009 | Lu et al. | |
| 2009/0148103 A1 | 6/2009 | Lu et al. | |
| 2009/0148104 A1 | 6/2009 | Lu et al. | |
| 2009/0162016 A1 | 6/2009 | Lu et al. | |
| 2010/0034502 A1 | 2/2010 | Lu et al. | |
| 2010/0035075 A1 | 2/2010 | Avazzeri et al. | |
| 2010/0266242 A1 | 10/2010 | Lu et al. | |
| 2010/0266244 A1 | 10/2010 | Lu et al. | |
| 2010/0290741 A1 | 11/2010 | Lu et al. | |
| 2012/0011514 A1 | 1/2012 | Burton et al. | |
| 2014/0133804 A1 | 5/2014 | Lu et al. | |
| 2014/0314379 A1 | 10/2014 | Lu et al. | |
| 2023/0045789 A1 | 2/2023 | Lu et al. | |

FOREIGN PATENT DOCUMENTS

| | | |
|---|---|---|
| EP | 0 156 075 A2 | 10/1985 |
| EP | 0 345 519 A2 | 12/1989 |
| EP | 0 547 778 A1 | 6/1993 |
| EP | 0 581 527 A1 | 2/1994 |
| EP | 0 689 069 A1 | 12/1995 |
| EP | 0 468 671 B1 | 1/1996 |
| EP | 0 762 171 A1 | 3/1997 |
| EP | 0 848 267 A2 | 6/1998 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |
| JP | 52-30447 | 3/1977 |
| JP | 58-142308 | 8/1983 |
| JP | 62-54204 | 3/1987 |
| JP | 4-44607 | 4/1992 |
| JP | 5-106765 | 4/1993 |
| JP | 8-62432 | 3/1996 |
| JP | 9-135526 | 5/1997 |
| JP | 9-159867 | 6/1997 |
| JP | 10-160969 | 6/1998 |
| JP | 11-160579 | 6/1999 |
| JP | 2000-292653 | 10/2000 |
| JP | 2001-116968 | 4/2001 |
| JP | 2003-195103 | 7/2003 |
| JP | 2005-114860 | 4/2005 |
| JP | 2006-146084 | 6/2006 |
| WO | WO 94/15232 | 7/1994 |
| WO | WO 94/25885 | 11/1994 |
| WO | WO 00/31575 | 6/2000 |
| WO | WO 01/27660 A2 | 4/2001 |
| WO | WO 01/92937 A1 | 12/2001 |
| WO | WO 03/073819 A2 | 9/2003 |
| WO | WO 2005/072395 A2 | 8/2005 |
| WO | WO 2005/101078 A1 | 10/2005 |
| WO | WO 2006/098734 A1 | 9/2006 |

OTHER PUBLICATIONS

European Search Report for Application No. 12194278.3 mailed Dec. 20, 2012.
European Search Report for Application No. 15190694.8 mailed Mar. 29, 2016.
International Search Report and Written Opinion cited in PCT/US2008/051782 mailed Aug. 18, 2008.
Invitation to Pay Additional Fees with Partial International Search cited in PCT/US2008/051782 mailed Jun. 25, 2008.
Mikon Series ST-III Multimode and Singlemode Connectors, 2 pages (Publicly known at least as early as Jan. 2, 1992).
Opti Tap™M Connector. An Evolant Solutions Product, 2 pages (Sep. 2005).
Patent Examination Report No. 1, Australian Patent Office, Patent Application No. 2008207974, Oct. 17, 2012, 6 pp.
Patent Examination Report No. 2, Australian Patent Office, Patent Application No. 2008207974, Aug. 1, 2013, 10 pp.
Examination Report, Australian Application No. 2019203886, dated Apr. 16, 2020, 3 pages.
Stratos Lightwave™ Brochure, "HDLC Hermaphroditic Butt Joint Connector," 2 pages (known as prior art at least as early as Sep. 8, 2003).
Stratos Lightwave™M Brochure, "HQLC Hermaphroditic Butt Joint Connector," 2 pages (known as prior art at least as early as Sep. 8, 2003).
Office Action, EP 08 728 121.8, May 25, 2012, 6 pages.
Office Action, EP 12 19 4278.3, Sep. 30, 2013, 5 pages.

* cited by examiner

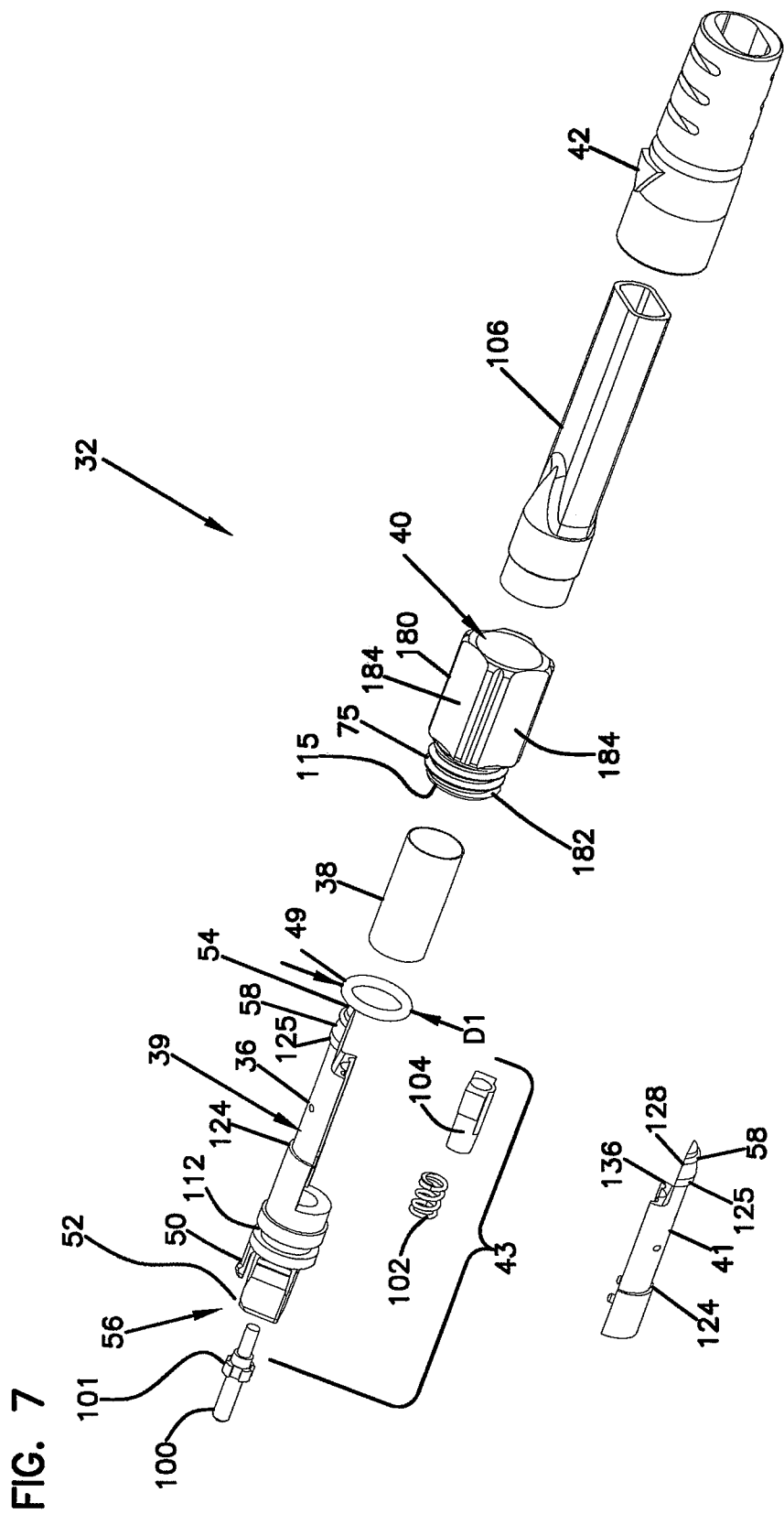

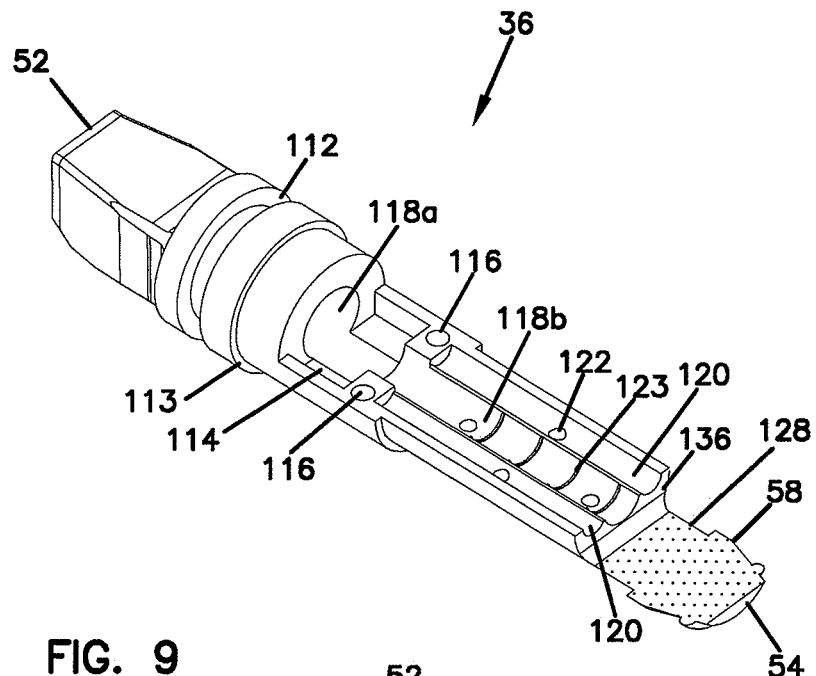
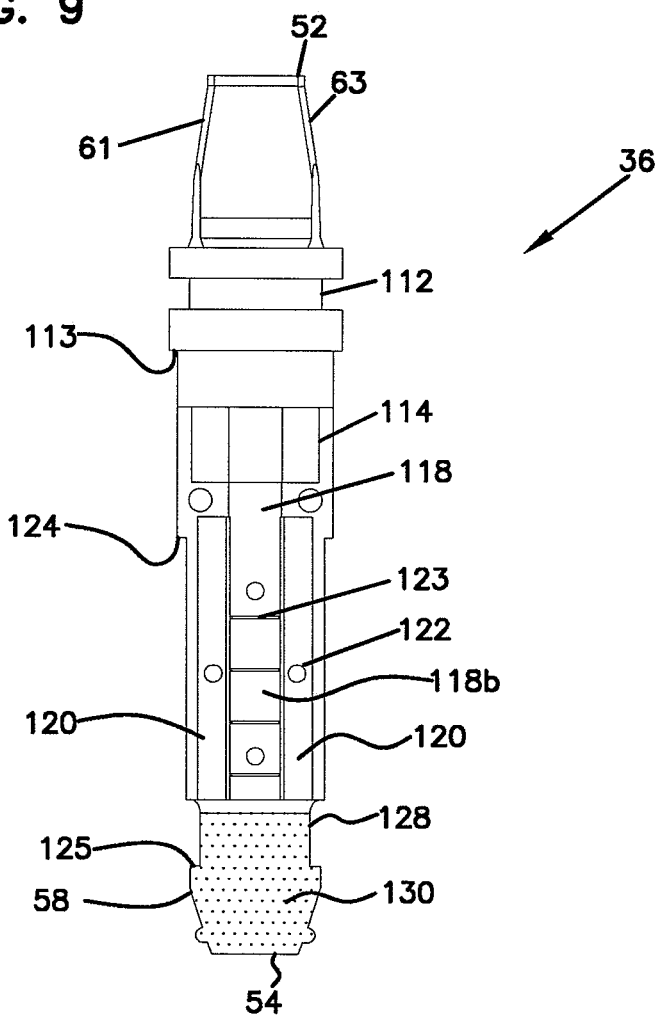

FIG. 18
FIG. 19
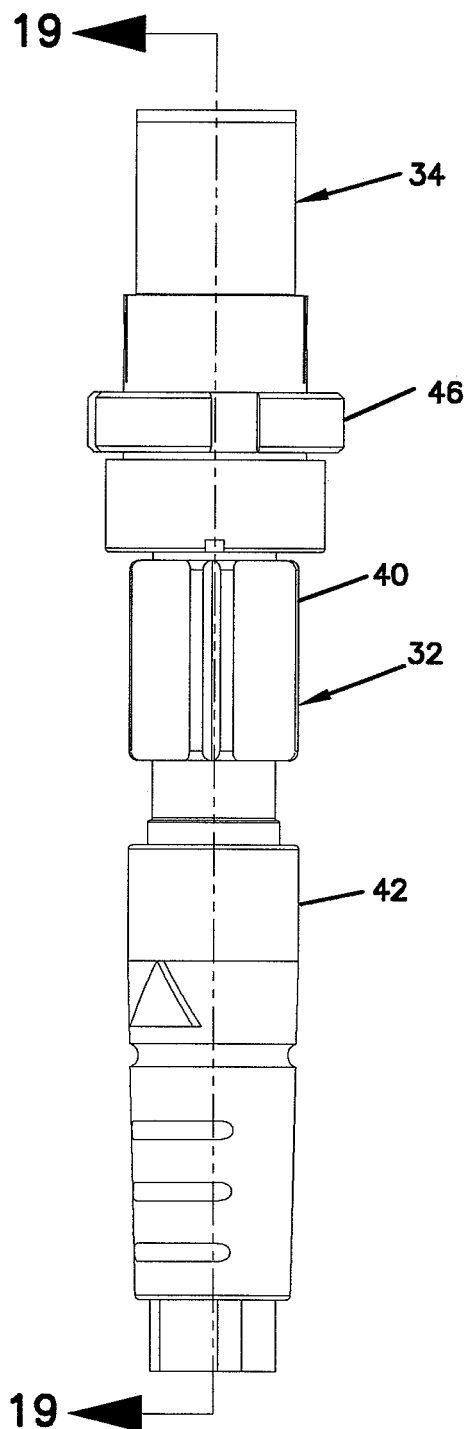
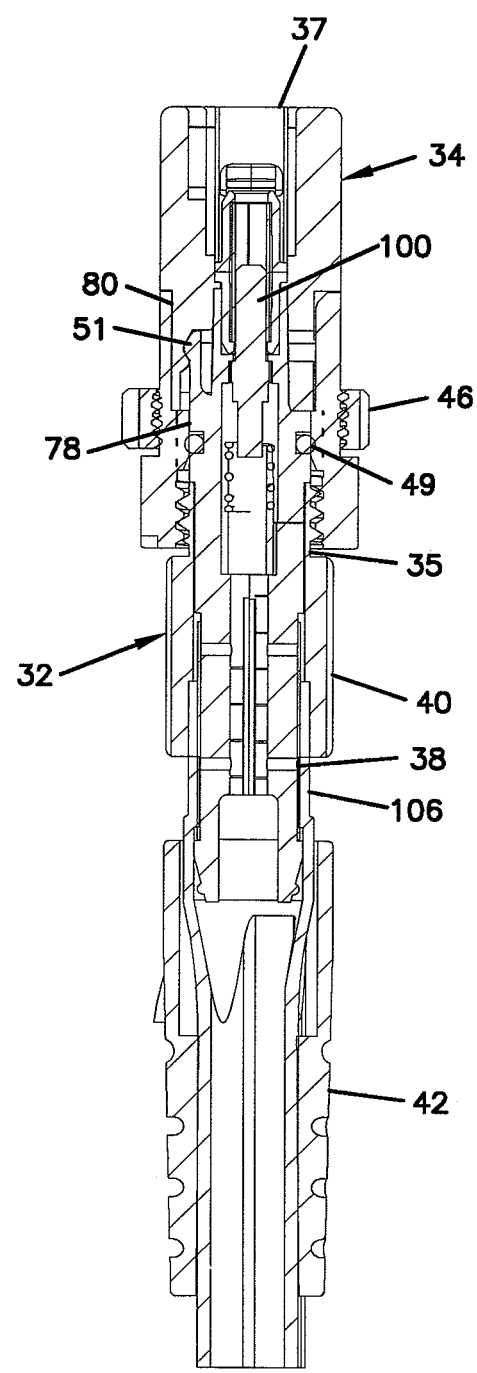

HARDENED FIBER OPTIC CONNECTOR

CROSS REFERENCE TO RELATED APPLICATIONS

This application is a continuation of U.S. application Ser. No. 17/809,973, filed Jun. 30, 2022, now abandoned; which is a continuation of U.S. application Ser. No. 17/091,397, filed Nov. 6, 2020, now U.S. Pat. No. 11,409,057, issued Aug. 9, 2022, which is a continuation of U.S. application Ser. No. 16/402,472, filed on May 3, 2019, now U.S. Pat. No. 10,877,224, issued on Dec. 29, 2020, titled FIBER OPTIC ADAPTER, which is a continuation of U.S. application Ser. No. 15/498,697, filed on Apr. 27, 2017, now U.S. Pat. No. 10,338,323, issued on Jul. 2, 2019, titled HARDENED FIBER OPTIC CONNECTOR, which is a continuation of U.S. application Ser. No. 14/323,135, filed on Jul. 3, 2014, now U.S. Pat. No. 9,664,862, issued on May 30, 2017, titled HARDENED FIBER OPTIC CONNECTOR, which is a continuation of U.S. application Ser. No. 12/333,509, filed on Dec. 12, 2008, now U.S. Pat. No. 8,770,862, issued on Jul. 8, 2014, titled HARDENED FIBER OPTIC CONNECTOR, which is a continuation of U.S. application Ser. No. 11/657,402, filed on Jan. 24, 2007, now U.S. Pat. No. 7,572,065, issued on Aug. 11, 2009, titled HARDENED FIBER OPTIC CONNECTOR, the disclosures of which are hereby incorporated by reference in their entireties.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

SUMMARY OF THE DISCLOSURE

One aspect of the present disclosure relates to a fiber optic connector having a dual fastening arrangement for securing the fiber optic connector in a fiber optic adapter.

Another aspect of the present disclosure relates to a fiber optic connector that is adapted to provide relatively high fiber optic circuit densities at an enclosure.

A further aspect of the present disclosure relates to a fiber optic connector having a tapered interface adapted to complement a corresponding tapered interface of a fiber optic adapter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is an exploded, perspective view of the fiber optic connector of the fiber optic connection system of FIG. 1;

FIG. 8 is a perspective view of a main body of the housing of the fiber optic connector of FIG. 7;

FIG. 9 is a plan view of the main body of FIG. 8;

FIG. 18 is a top view of the fiber optic connection system and fiber optic cable of FIG. 2;

FIG. 19 is a cross-sectional view taken along section line 19-19 of FIG. 18;

DETAILED DESCRIPTION

Figure 1:
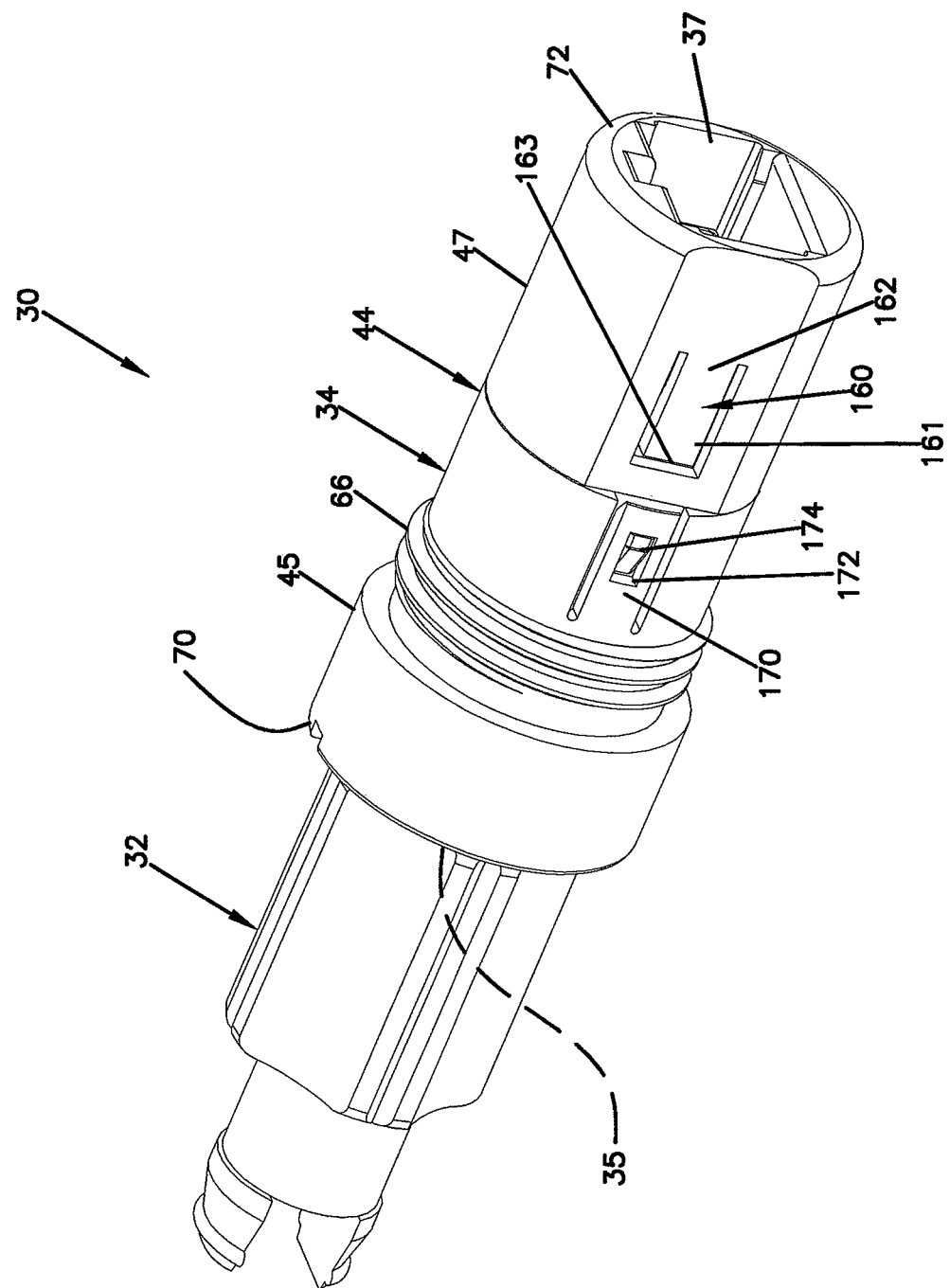
FIG. 1 is a perspective view of an example fiber optic connection system having features that are examples of inventive aspects in accordance with the principles of the present disclosure.
Figure 2:
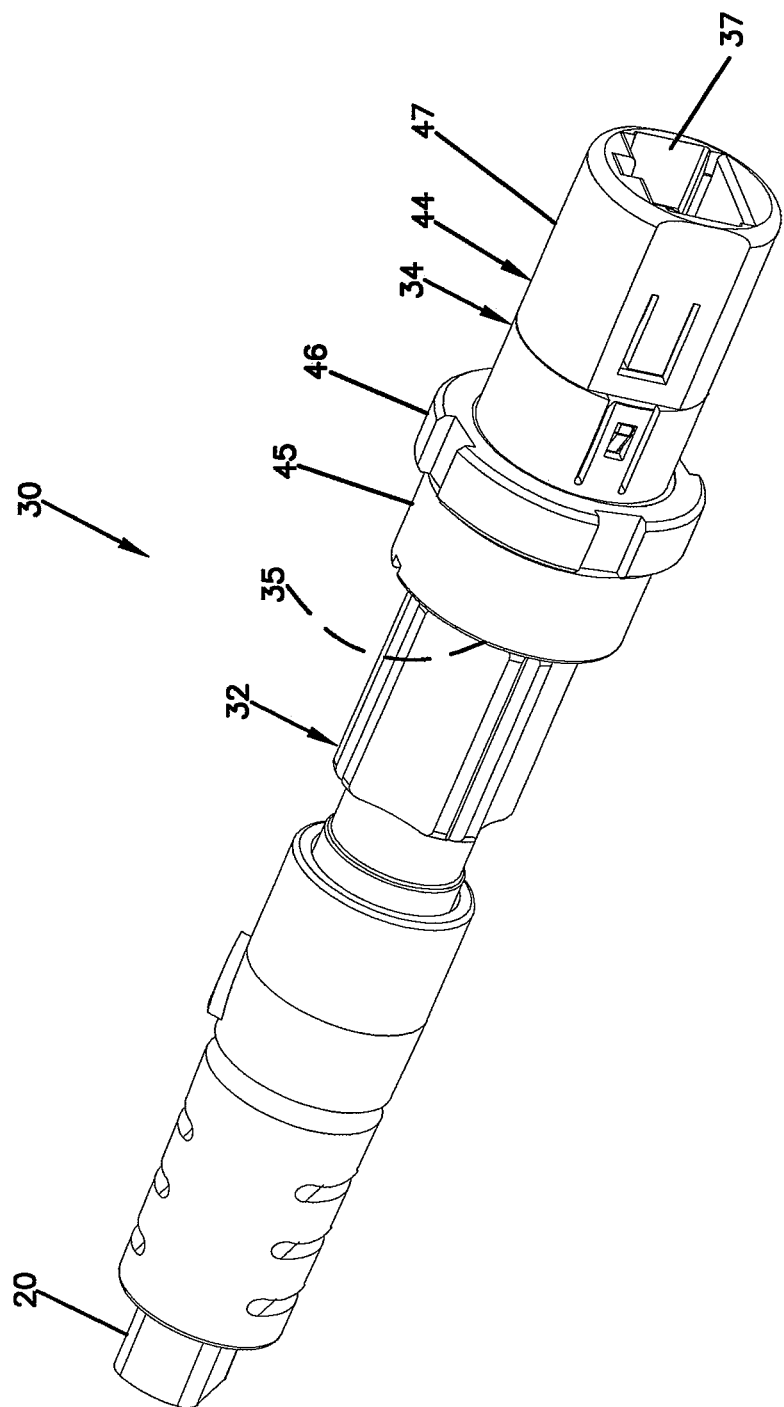
FIG. 2 is a perspective view of the fiber optic connection system of FIG. 1 with a connector of the fiber optic connection system terminating the end of a fiber optic cable.
Figure 3:
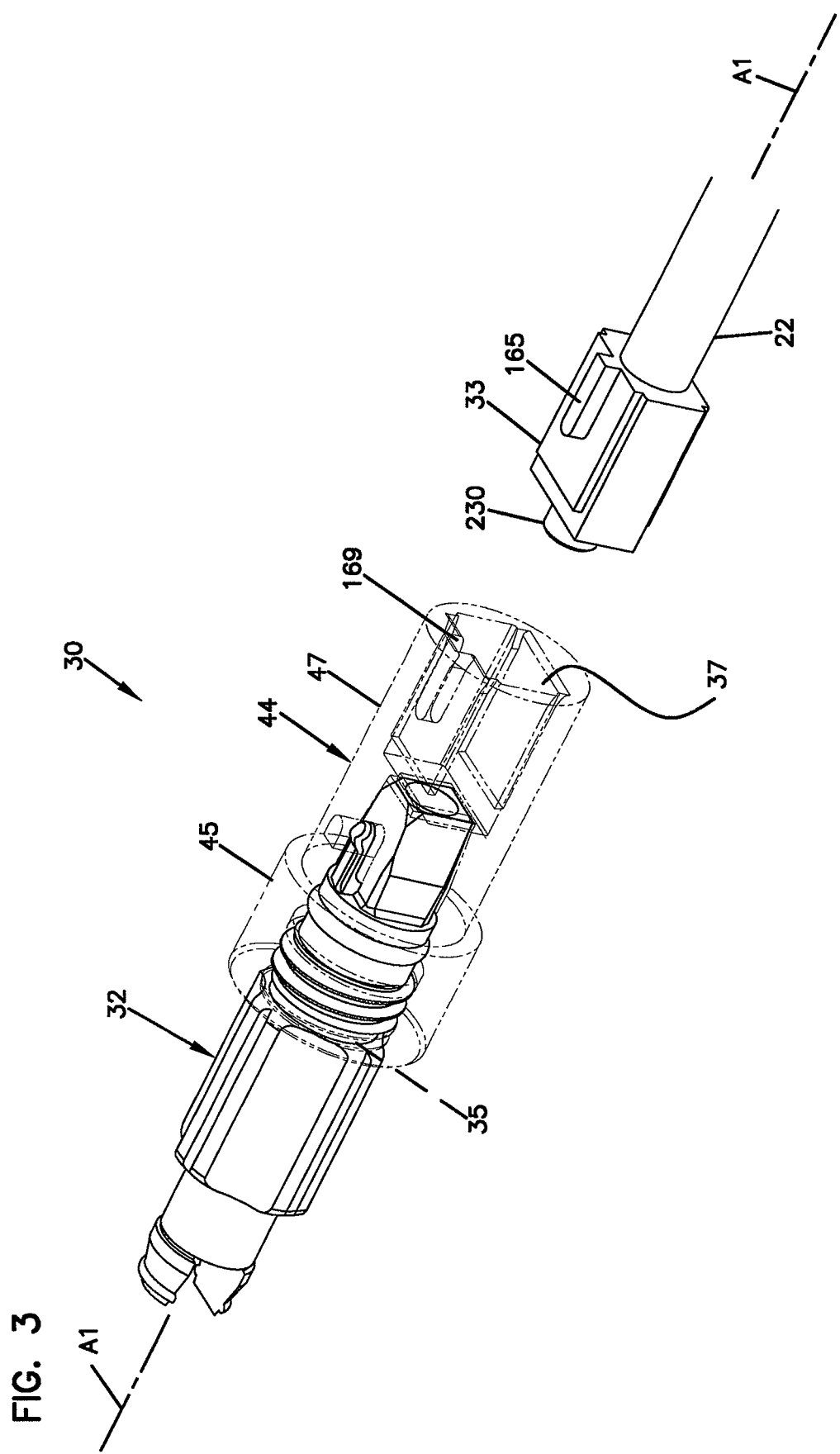
FIG. 3 shows the fiber optic connection system of FIG. 1 with an adapter of the fiber optic connection system shown in phantom lines.
Figure 4:
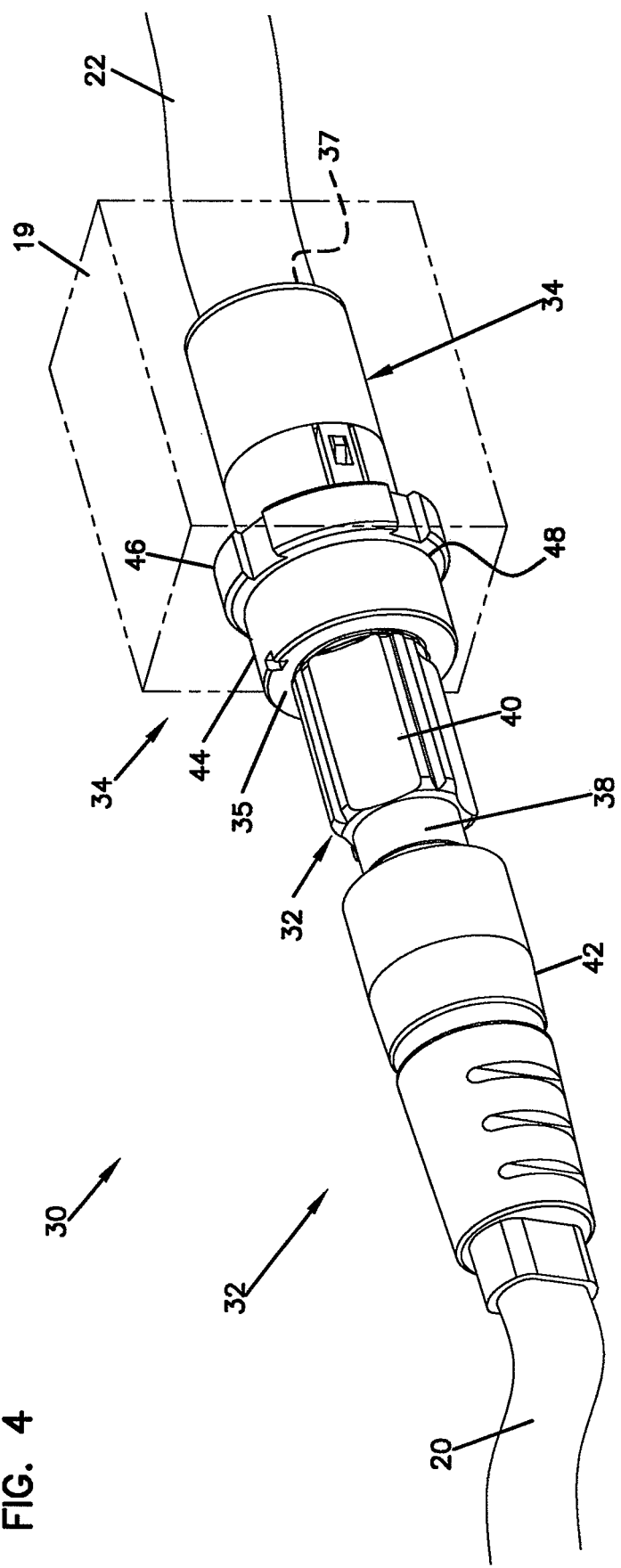
FIG. 4 shows the fiber optic connection system of FIG. 1 with an adapter of the fiber optic connection system mounted to a schematic enclosure.

FIGS. 1-5 depict a fiber optic connection system 30 in accordance with the principles of the present disclosure for optically connecting a first fiber optic cable (see FIG. 4) to a second fiber optic cable 22 (see FIG. 4). The fiber optic connection system 30 includes a fiber optic adapter 34, a first fiber optic connector 32 terminating the first cable 20, and a second fiber optic connector 33 (shown at FIG. 3) terminating the second fiber optic cable 22. The adapter 34 is depicted mounted to an enclosure 19 (shown schematically at FIG. 4). The adapter 34 includes a first port 35 for receiving the first connector 32 and a second port 37 for receiving the second connector 33. The first cable 20 is optically coupled to the second cable 22 when the connectors 32, 33 are positioned within their respective ports 35, 37 of the adapter 34.

As shown at FIG. 4, the first cable 20 is an external cable (e.g., an outside plant cable located outside the enclosure 19) and the second cable 22 is located inside the enclosure 19. In such an embodiment, the first cable 20 cable is adapted to carry an optical signal to the enclosure 19 and the fiber optic connection system 30 allows the signal to be transferred from the first cable 20 to the second cable 22.

Figure 5:
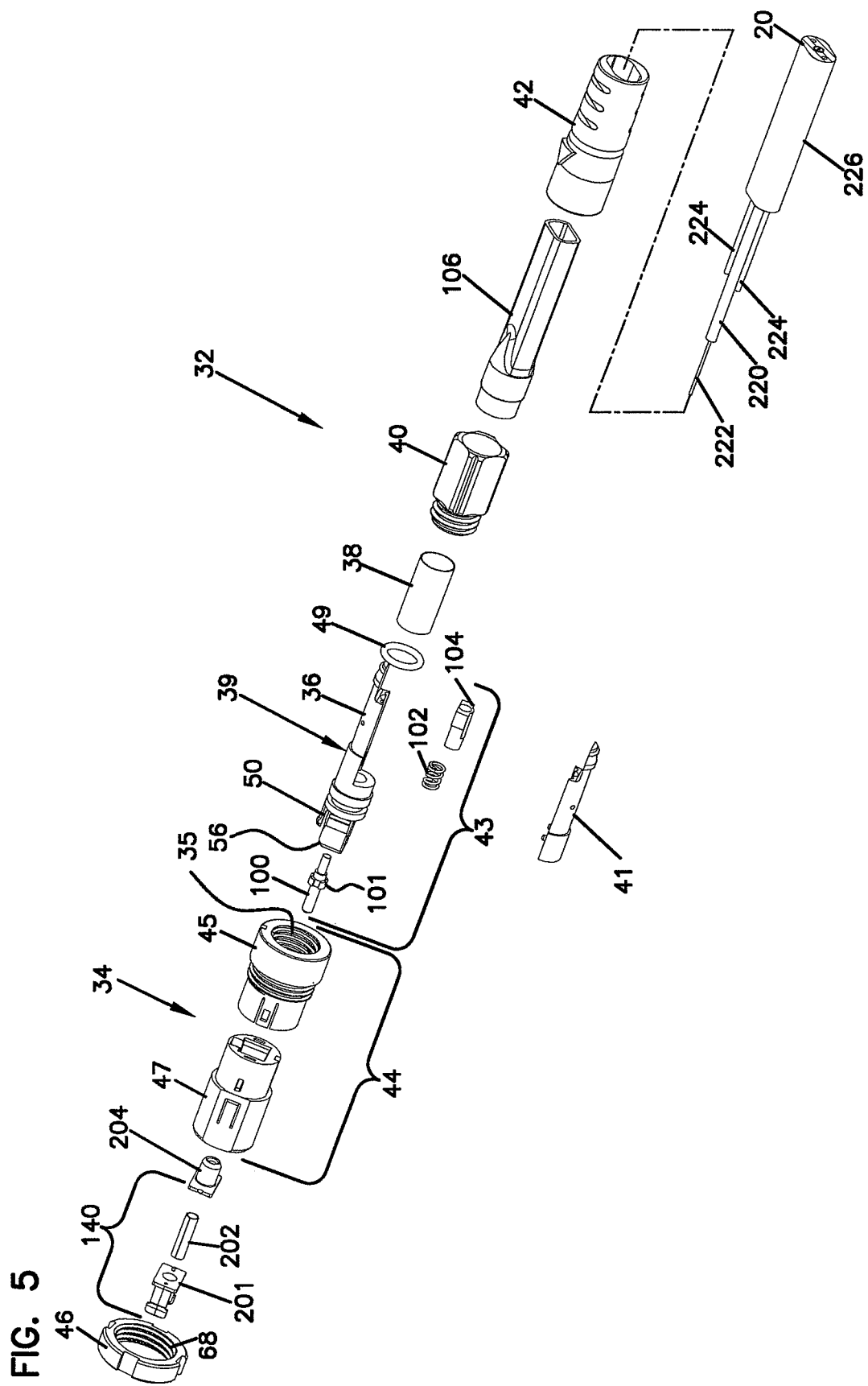
FIG. 5 is an exploded, perspective view of the fiber optic connection system of FIG. 1.
Figure 6:
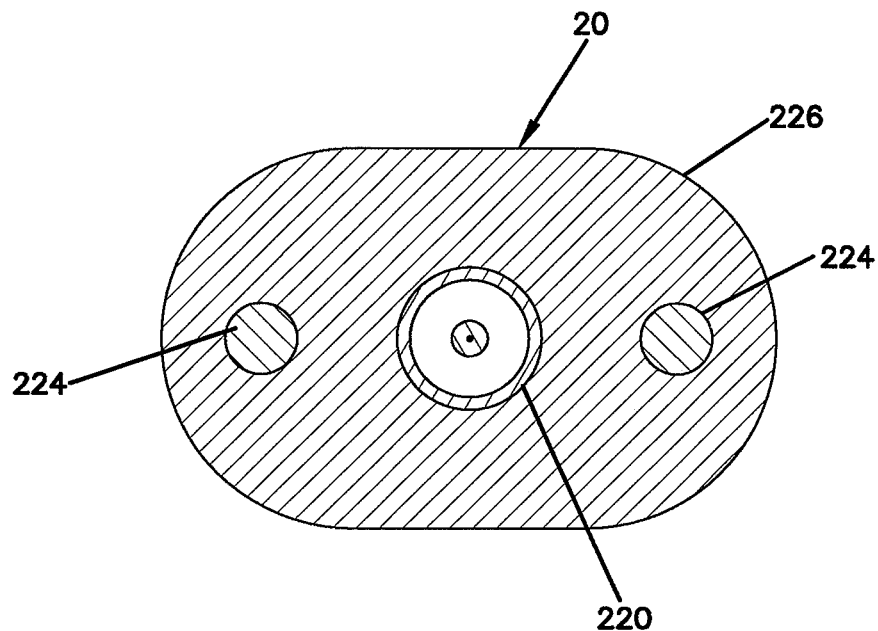
FIG. 6 is a cross-sectional view taken along section line 6-6 of FIG. 5.

The cables 20 and 22 each include one or more optical fibers capable of carrying optical signals. The optical fibers include a core surrounded by cladding. The core is the light-conducting central portion of an optical fiber. The cladding surrounds the core and is composed of a material having a lower index of refraction than the material of the core. Light is internally reflected within the core to transmit the optical signal along the core. The optical fibers can be protected within buffer tubes. The fiber optic cables also can include strength members within the fiber optic cables to increase the tensile strength of the fiber optic cables. The optical fibers, strength members, buffer tubes and other cable components can be surrounded by an outer jacket or sheath that provides a protective covering for cable components. As shown at FIG. 5, the first cable 20 includes a central buffer tube 220 containing at least one optical fiber 222. Strength members 224 are positioned on opposite sides of the central buffer tube 220. The strength members 224 and the buffer tube are positioned within an outer jacket 226 of the cable 20.

The enclosure 19 can include a wide variety of optical enclosures/housings (e.g., drop terminals, pedestals, network interface devices, fiber distribution hubs, splice enclosures, optical network terminals, etc.). In one embodiment, adapters 34 can be mounted to a drop terminal of the type disclosed at U.S. patent application Ser. No. 11/075,847, entitled Fiber Access Terminal, filed on Mar. 8, 2005, and that is hereby incorporated by reference in its entirety. For such embodiments, the cable 20 can be a drop cable routed to a subscriber premises and the cable 22 can be a connectorized fiber from a stub cable that is routed from the drop terminal to a fiber break-out location of a fiber distribution cable. Example fiber break-out configurations are disclosed at U.S. patent application Ser. No. 11/491,336, entitled Fiber Optic Cable Breakout Configuration with Retention Block, filed on Jul. 21, 2006, and that is hereby incorporated by reference in its entirety. In another embodiment, one or more of the adapters can be mounted to a network interface device of the type disclosed at U.S. application Ser. No. 11/607,676, entitled Network Interface Device, filed on Dec. 1, 2006, and that is hereby incorporated by reference in its entirety. In such an embodiment, the first cable 20 can include a drop cable and the cable 22 can include a connectorized cable/fiber positioned within the network interface device. Alternatively, fiber optic connection system 30 can also be used without an enclosure (e.g., the adapter can be panel mounted).

In the depicted embodiment, the first connector 32 and the adapter 34 are hardened or ruggedized. By hardened or ruggedized, it is meant that first connector 32 and the adapter 34 are adapted for outside environmental use. For example, the first connector 32 and the adapter 34 can include environmental seals for preventing moisture/water intrusion. Also, it is preferred for the first connector 32 to be able to withstand a 100 pound axial pull-out force when coupled to the adapter 34. The second connector 33 can be a conventional fiber optic connector such as a Subscription Channel ("SC") connector. One example of an SC connector is illustrated and described in U.S. Pat. No. 5,317,663, that is hereby incorporated by reference in its entirety.

Referring to FIGS. 5 and 7, the first connector 32 includes a connector housing 39 including a main body 36 and a cover 41. The connector housing 39 extends from a distal end 52 to a proximal end 54 (distal and proximal are defined with respect to the connection with fiber optic cable 20 for connector 32). A ferrule assembly 43 mounts adjacent the distal end 52 of the connector housing 39 and a strain relief boot 42 mounts adjacent the proximal end 54 of the connector housing 39. A sealing member 49 (e.g., an o-ring seal) mounts around a periphery/exterior of the connector housing 39. The sealing member 49 is adapted for providing a seal between the connector housing 39 and the adapter 34 when the first connector 32 is plugged into the first port 35 of the adapter 34. The first connector 32 also includes a crimp band 38 that mounts over the main body 36 and the cover 41, and a sealing tube 106 that seals the interface between the cable 20 and the connector housing 39. The crimp band 38 assists in retaining the cover 41 on the main body 36 and also assists in securing the strength members 224 of the cable 20 in place between the cover 41 and the main body 36. The first connector 32 also includes first and second fastening structures for retaining (i.e., connecting, securing, etc.) the first connector 32 within the first port 35 of the adapter 34. For example, the first connector 32 can include a latch 50 (see FIGS. 3, 7, 14 and 15) for mechanically interlocking with the adapter 34 when the first connector 32 is inserted in the first port 35. The first connector 32 also includes a coupling nut 40 adapted to thread into the adapter 34 to retain the first connector 32 within the first port 35 of the adapter 34.

Figure 10:
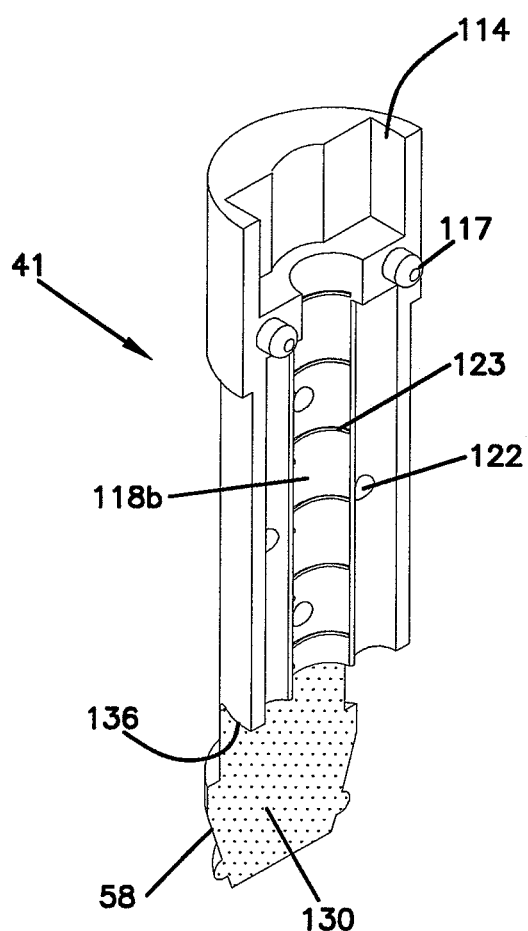
FIG. 10 is a perspective view of a cover of the housing of the fiber optic connector of FIG. 7.
Figure 11:
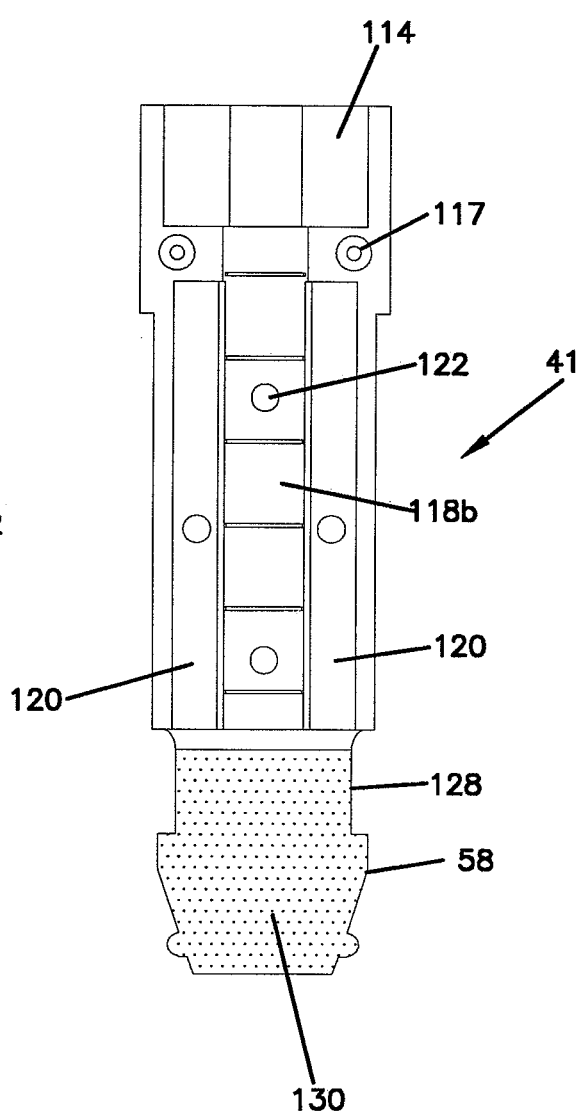
FIG. 11 is a plan view of the cover of FIG. 10.

The connector housing 39 of the connector 32 extends from distal end 52 to proximal end 54. A plug portion 56 is defined at the distal end 52 and two tabs 58 are provided at the proximal end 54. One of the tabs 58 is provided by the body 36 of the housing and the other of the tabs 58 is provided by the cover 41 of the housing 39. The body 36 is depicted as a unitary molded piece (e.g., a molded plastic piece as shown at FIGS. 7-9) and the cover 41 is depicted as a separate unitary molded piece (e.g., a molded plastic piece as shown at FIGS. 7, 10 and 11). A central passage 118 is defined through the interior of the connector housing 39 from the proximal end 54 to the distal end 52. The central passage 118 has a distal portion 118a defined through the plug portion 56 of the connector housing 39 and a proximal portion 118b defined between the body 36 and the cover 41. The proximal portion 118b of the central passage 118 is defined in part by the body 36 and in part by the cover 41. Removal of the cover 41 from the body 36 provides lateral access to the proximal portion 118b of the central passage 118. The distal portion 118a of the passage 118 is defined entirely by the body 36 and extends through the plug portion 56. The distal portion 118a of the passage 118 has a distal end at the distal end 52 of the housing 39 and a proximal end adjacent the proximal portion 118b of the passage 118.

Figure 17:
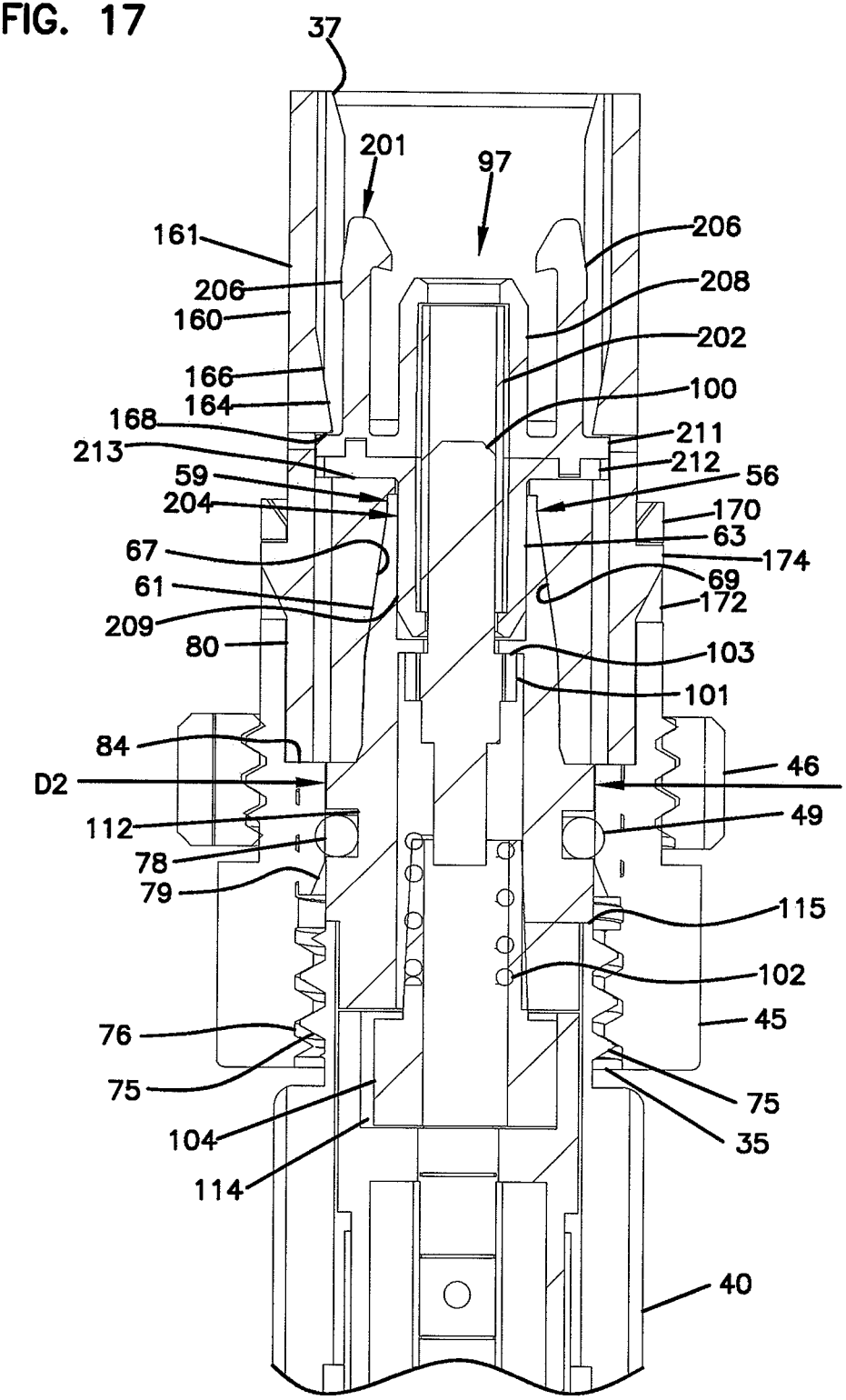
FIG. 17 is a cross-sectional view taken along section line 17-17 of FIG. 16.
Figure 20:
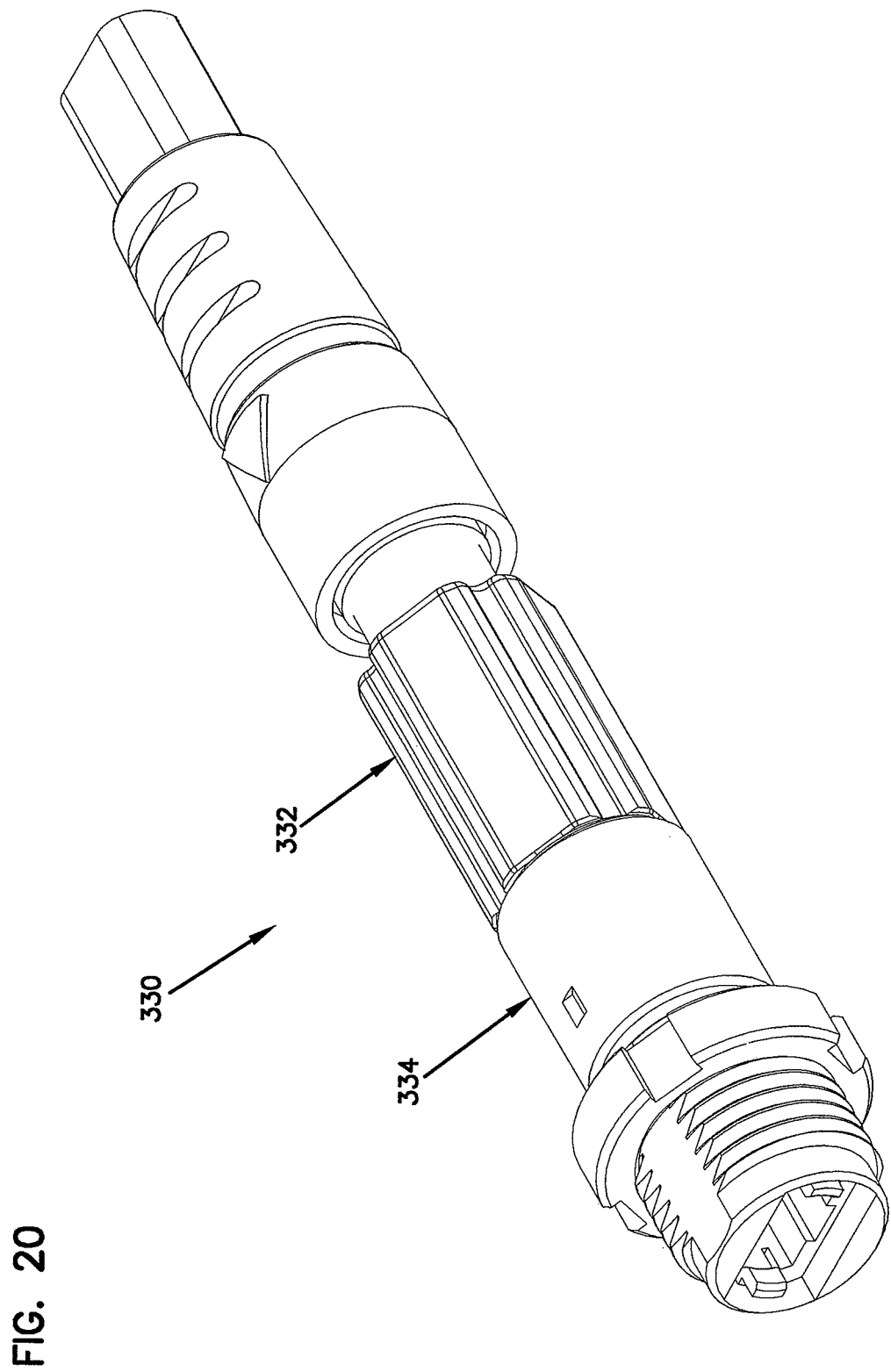
FIG. 20 is a perspective view of another fiber optic connection system having features that are examples of inventive aspects in accordance with the principles of the present disclosure.
Figure 21:
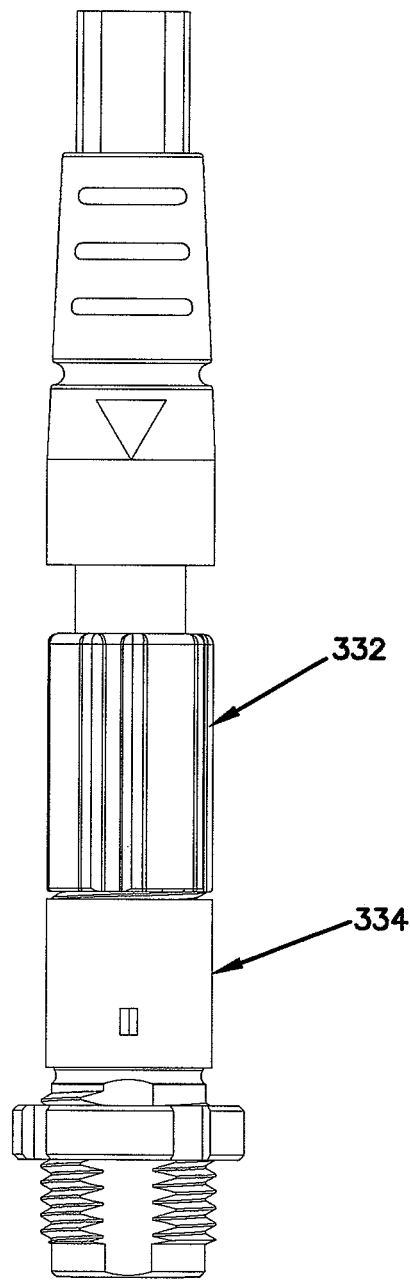
FIG. 21 is a top view of the fiber optic connection system of FIG. 20.
Figure 22:
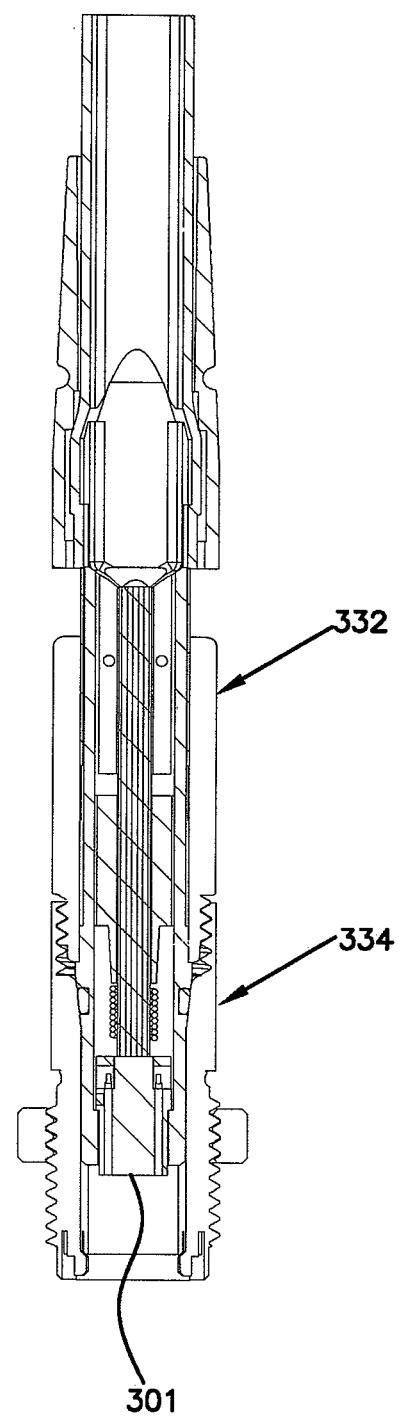
FIG. 22 is a cross-sectional view taken along section line 22-22 of FIG. 23.
Figure 23:
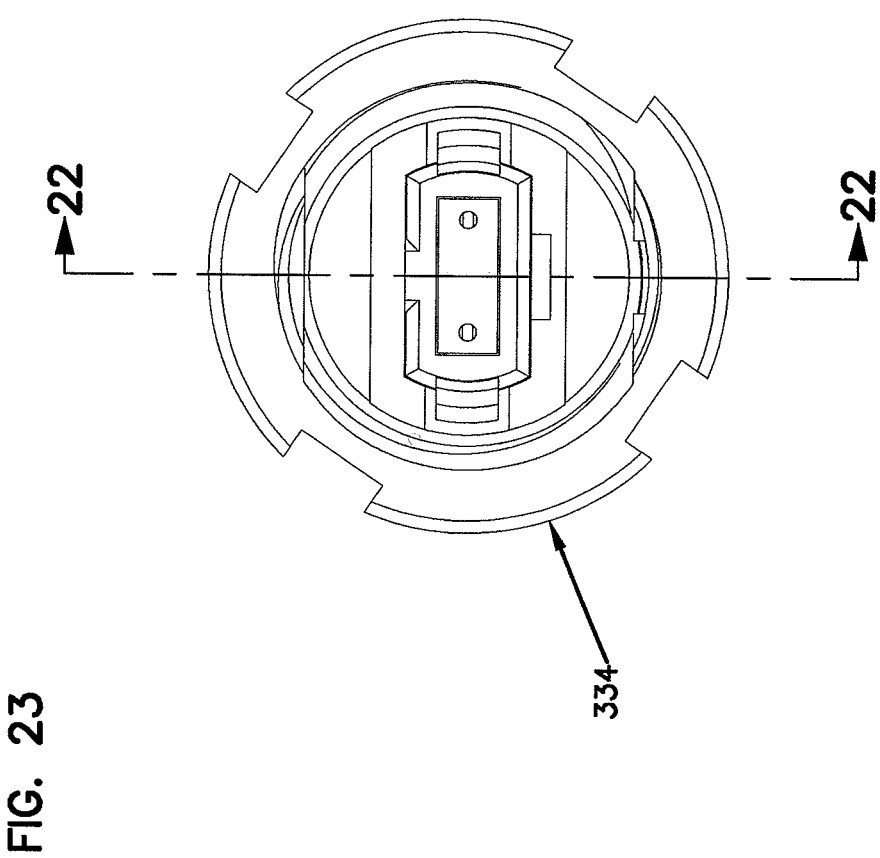
FIG. 23 is an end view of the fiber optic connection system of FIG. 20.

The plug portion 56 of the first connector 32 is sized and shaped to fit within the first port 35 of the adapter 34, as shown at FIGS. 3, 17 and 19. The distal end of the plug portion 56 preferably has a tapered configuration that mates or matches (e.g., nests, complements) with a tapered portion of a first plug receptacle 59 accessed from the first port 35 (see FIG. 17). As shown at FIG. 17, the tapered configuration is defined by opposite surfaces (e.g., left and right surfaces 61, 63) that converge as the surfaces extend along a central axis A1 of the connector 32 in a distal direction. The end of the plug portion 56 is truncated. When the plug portion 56 is positioned within the first plug receptacle 59, the surfaces 61, 63 engage and are parallel to or generally parallel to angled surfaces 67, 69 that define the first plug receptacle 59.

Figure 14:
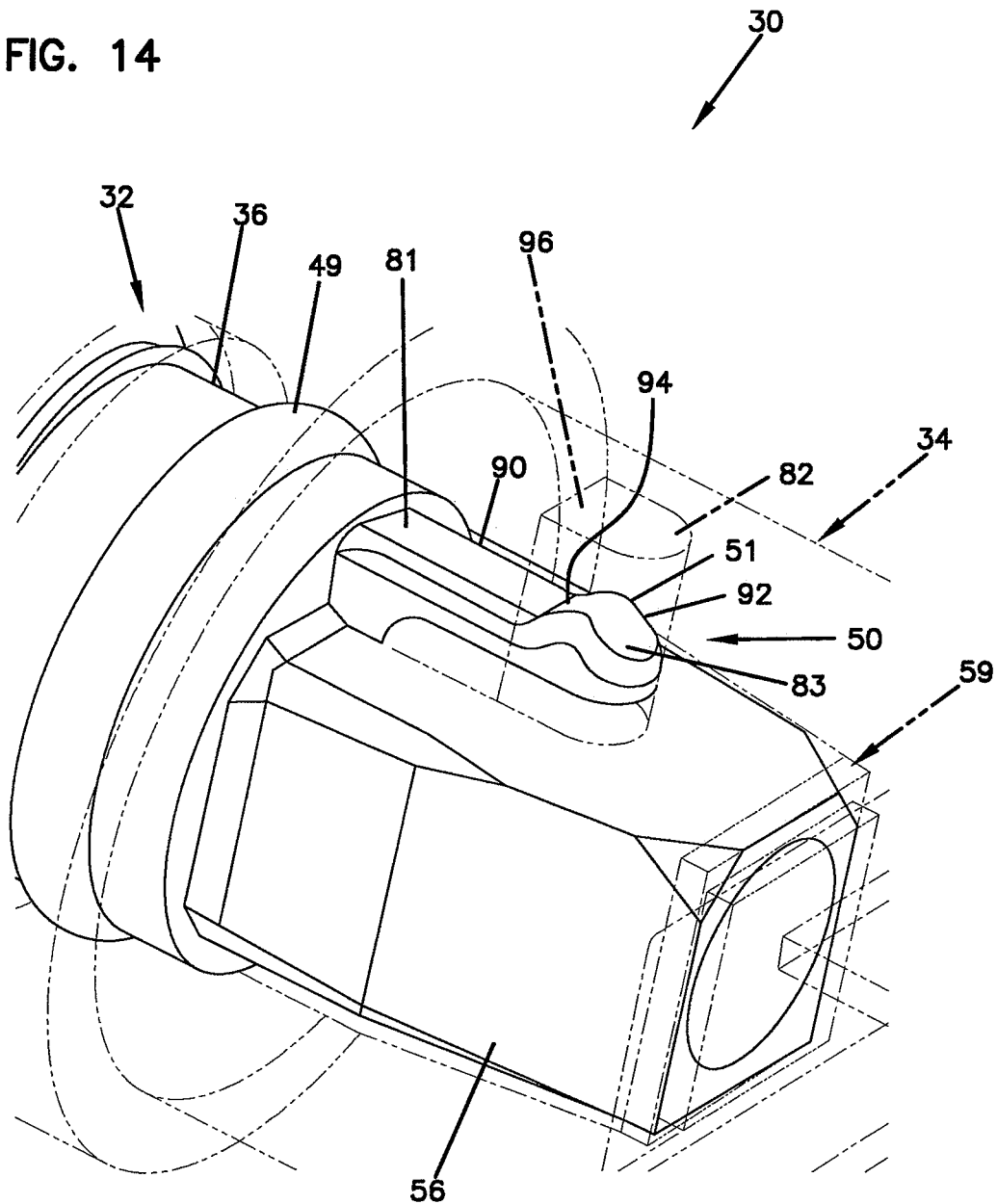
FIG. 14 is an enlarged view of a portion of FIG. 3.
Figure 15:
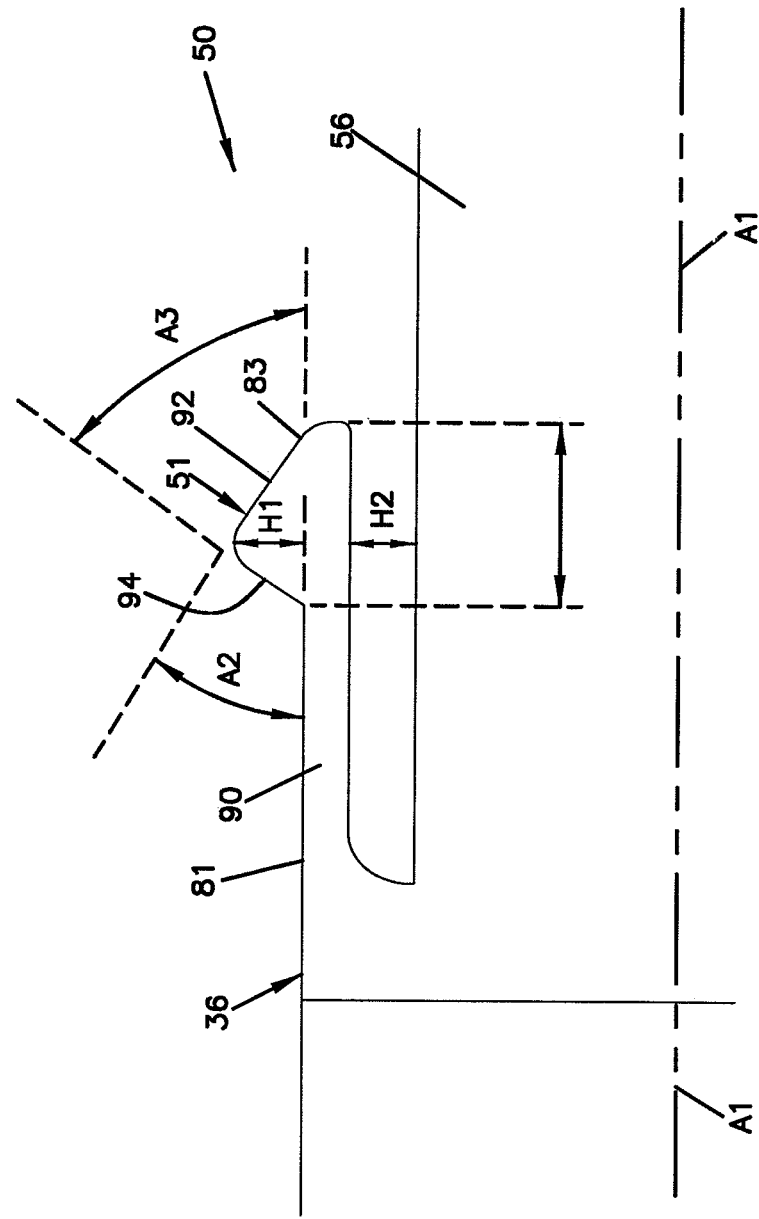
FIG. 15 is an enlarged view of a latch provided on the fiber optic connector of the fiber optic connection system of FIG. 1.
Figure 16:
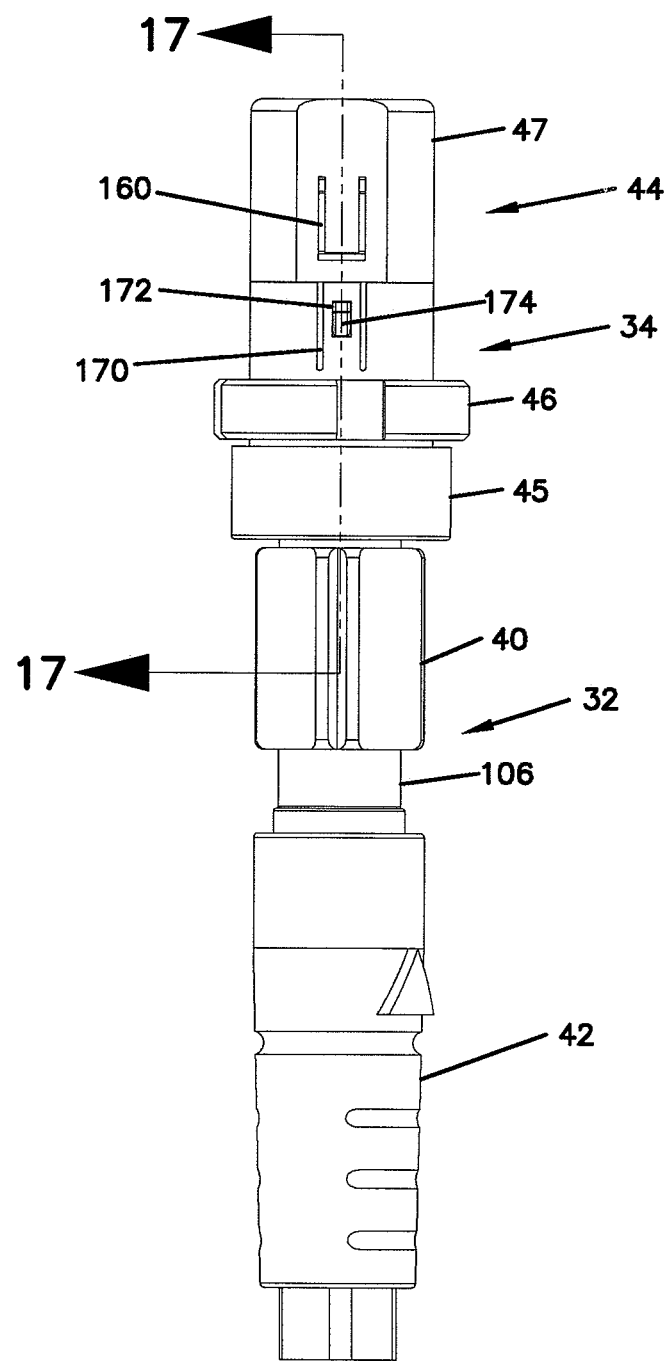
FIG. 16 is a side view of the fiber optic connection system and fiber optic cable of FIG. 2.

As shown at FIGS. 14 and 15, the latch 50 of the first connector 32 is provided at a top side of the plug portion 56. The latch 50 has a cantilever arm 90 with a base end 81 that is integrally molded with the plug portion 56. The arm 90 extends in a distal direction from the base end 81 to a free end 83. A retention tab 51 is provided adjacent the free end 83 of the arm 90. The retention tab 51 includes an inclined region 92 and a declined region 94. The arm 90 is configured to flex as the plug portion 56 is inserted into the first port 35 of the adapter 34, and to provide a snap-fit connection between the first connector 32 and the adapter 34 when the plug portion 56 is fully inserted into the first port 35. For example, as shown at FIG. 14, retention tab 51 snaps within a latch notch 82 defined by the adapter 34 when the plug portion 56 is fully inserted in the first port 35. The latch notch 82 is defined in part by a retention surface 96.

When inserting the plug portion 56 into the first port 35 of the adapter 34, the arm 90 of the latch 50 is flexed toward axis A1 by adapter 34 as the inclined region 92 comes into contact with adapter 34. Arm 90 is designed of a material capable of flexing when compressed, such as a plastic. Insertion of plug portion 56 into the port 35 continues until the inclined region 92 passes by the retention surface 96 of the notch 82. After the inclined region 92 is entirely past the retention surface 96, the declined region 94 comes into contact with surface 96. A force generated by the flexing of arm 90 causes the retention tab 51 to raise as the declined region 94 proceeds past surface 96. Insertion continues until declined region 94 is completely, or almost completely, past the retention surface 96 of the notch 82. At this point, compression of the arm 90 by adapter 34 is released, such that the arm 90 returns to its uncompressed state. Alternatively, the adapter 34 can be designed to retain some of the compression of arm 90, if desired.

One of the benefits of the latch mechanism is that it provides a force that inhibits removal of the first connector 32 from the first port 35, such as to resist unintentional disengagement of the first connector 32 from the first port 35. For example, if the first connector 32 begins to move in a direction away from the first port 35, the declined region 94 comes into contact with the retention surface 96 of latch notch 82. At this point, in order for the first connector 32 to be removed from the first port 35, a force must be applied in a direction away from the first port 35 sufficient to cause the arm 90 to compress as declined region 94 is pulled back along surface 96. The force required can be configured to be greater or lesser by adjusting the strength of the arm 90, and also by adjusting the slope of declined region 94. The snap-fit configuration of the latch 50 also provides a physical and audible indication that the first connector 32 has been fully inserted into the first port 35.

The inclined region 92 of the retention tab 51 has an angle of incline illustrated as A2 and the declined region 94 of the retention tab 51 has an angle of decline illustrated as A3. In the illustrated embodiment, angle A2 is less than angle A3. The benefit of this is that the latch 50 will be easier to insert than it will be to remove, because the decreased angle of incline (A2) will not present as much resistance to insertion as the increased angle of decline (A3) will present to removal. In one example, angle A3 is about double angle A2. In another example, angle A2 is about equal to angle A3. It is recognized, however, than any angles may be formed for angles A2 and A3. In one example, angles A2 and A3 are in a range from about 0 degrees to about 90 degrees, and preferably from 15 degrees to about 85 degrees. In another example, angle A2 is in a range from about 15 degrees to about 45 degrees and angle A3 is in a range from about 30 degrees to about 90 degrees.

The inclined and declined regions 92 and 94 meet at a peak, having a height H1. The arm 90 extends a height H2 above an adjacent portion of plug portion 56. In one example, height H1 is about equal to height H2. Alternatively, height H2 is larger than height H1 to ensure that latch 50 is not inhibited from movement by the adjacent portion of plug portion 56. Alternatively, height H2 can be less than height H1, so long as adequate space is provided to enable latch 50 to be appropriately inserted into notch 82.

In another example, angle A3 can be about 90 degrees, such that the declined region 94 extends generally perpendicular to the arm 90. In this example, the declined region 94 will not permit the latch 50 to be removed by the mere application of a force in a direction away from the port 35. Rather, the latch 50 can be manually released, such as by manually depressing the latch 50, such as through the notch 82. The latch 50 can be depressed, for example, by inserting a narrow release tool through the notch 82 to depress the latch 50. Alternatively, a button can be formed over the notch 82. The button can include an arm that extends through the notch 82, such that when the button is depressed, the arm depresses the latch 50, enabling the first connector 32 to be removed from the first port 35.

The coupling nut 40 of the first connector 32 is adapted to provide a second connection mechanism for securing the first connector 32 to the adapter 34. After the latch 50 has interlocked with the adapter 34, the coupling nut 40 can be threaded into corresponding threads provided within the first port 35 so as to provide a second connection with the adapter 34. The coupling nut 40 provides a connection with the adapter 34 that has a substantially greater pull-out resistance from the pull-out resistance provided by the latch 50. In one example embodiment, the coupling nut 40 retains the first connector 32 in the first port 35 even if a pull-out force of at least 100 pounds is applied to the first connector 32.

The coupling nut 40 of the first connector 32 includes a first region 180 and a second region 182. The first region 180 includes a plurality of grooves 184 to facilitate grasping of the first region 180, such as by a field technician or other user during connection or disconnection of the connector 32 with the adapter 34. The grooves 184 are for example a plurality of longitudinally oriented grooves that enable a user to more easily rotate the coupling nut 40. Turning of the coupling nut 40 enables a connection means of the second region 182 to engage or disengage with the adapter 34. In the illustrated embodiment, the second region 182 includes a connection means of exterior screw threads 75 adapted to mate with internal threads 76 provided within the first port 35 of the adapter 34. In another embodiment, other connection means may also be used.

The ferrule assembly 43 of the first connector 32 includes a ferrule 100 (e.g., a ceramic ferrule), a barrel 101 mounted on the ferrule 100, a spring 102 and a spring holder 104. The ferrule assembly 43 is loaded into the first connector 32 while the cover 41 is removed from the main body 36. To load the ferrule assembly 43 into the connector housing 39, the ferrule 100 is positioned in the distal portion 118a of the central passage 118 by inserting the ferrule 100 through the proximal end of the distal portion 118a. As so inserted, the barrel 101 abuts against a shoulder 103 located within the plug portion 56 (see FIGS. 17 and 19). The spring 102 is then inserted into the distal portion 118a behind the ferrule 100. Thereafter, the spring holder 104 is loaded into a pocket 114 (see FIGS. 8-11) of the main body 36 at a location behind the spring 102 such that the spring 102 is captured within the distal portion 118a between the barrel 101 and the spring holder 104. In this manner, the ferrule 100 is spring biased in a distal direction.

The proximal portion of the connector housing 39 is configured to facilitate providing a secure connection between the first cable 20 and the first connector 32. For example, the proximal portion 118b of the central passage 118 is sized to receive the buffer tube 220 of the first cable 20. Strength member receivers 120 (e.g., channels, passages, grooves, etc.) are provided on opposite sides of the proximal portion 118b of the central passage 118 for receiving the strength members 224 of the first cable 20. The body 36 includes alignment openings 116 that receive corresponding alignment pins 117 of the cover 41 to ensure that that cover 41 properly aligns with the body 36 when mounted thereto. The connector housing 39 further includes bleed openings 122 for allowing adhesive to bleed from the interior of the housing 39 when the cover 41 is mounted to the body 36. The interior of the housing 39 further includes structure for improving adhesion between adhesive and the interior of the housing. For example, the interior of the housing includes a plurality of slots 123 for improving the adhesion characteristics of the interior surface of the housing 39. Other adhesion improving structures include knurling, surface roughening, or other structures.

The exterior of the connector housing 39 includes a circumferential groove 112 for mounting the sealing member 49. The exterior of the housing 39 also includes circumferential shoulders 124 and 125 (see FIG. 7), against which the crimp band 38 can abut after assembly of the connector, and a circumferential shoulder 113 (shown in FIGS. 8 and 9). A circumferential recessed portion 128 is defined on the outside of the tabs 58. Retaining teeth 130 are located on the inside of the tabs 58.

Installation of connector 32 onto the end of a fiber optic cable 20 will now be described with reference to FIG. 5. To begin installation, the end of the fiber optic cable 20 is prepared using a stripping process. In the stripping process, the outer jacket 226 is stripped away to expose the strength members 224 and the buffer tube 220. After the stripping process, a portion of the buffer tube 220 is cut away to expose the optical fiber 222.

After the end of the cable 20 has been prepared as described above, the boot 42 is slid onto the end of fiber optic cable 20, followed by the sealing tube 106 (e.g., a heat shrink tube or heat shrink tape/wrap), the coupling nut 40, and the crimp band 38. The bare optical fiber 222 is then fed through the spring holder 104 and the spring 102, and is mounted within the ferrule 100. The ferrule assembly 43 is then loaded into the plug portion 56 of the connector housing 39.

Once the ferrule assembly has been loaded into the connector housing 39, the first cable 20 is secured to the connector housing 39 such that cable 20 extends longitudinally from the proximal end 54 of the housing 39. FIGS. 5 and 7 are perspective views of the body 36 having the cover 41 separated from it, such as in position for installation with a fiber optic cable. To make the connection, the strength members 224 of the fiber optic cable 20 are inserted into strength member receivers 120 and the buffer tube 220 is inserted into the proximal portion 118b of the central passage 118, such that the optical fiber 222 extends generally along axis A1. Adhesive is then applied to the buffer tube 220, strength members 224, central passage 118, and strength member receivers 120, including those in both body 36 and cover 41. The adhesive may be an epoxy or any other type of adhesive. Alternatively, fasteners could also be used to connect cover 41 with body 36. The body 36 and the cover 41 are properly aligned by the pins 117 located on the internal side of cover 41 that are inserted into the alignment openings 116 of the body 36. The cover 41 is then squeezed against body 36 to enclose the strength members 224, the buffer tube 220 and the optical fiber 222 within the connector housing 39. The adhesive bleed openings 122 provided in the body 36 and the cover 41 enable excess adhesive to be discharged from the housing 39. When the cover 41 is squeezed onto the body 36, the excess adhesive flows out from bleed openings 122 and can then be wiped away.

The fiber optic cable 20 is preferably stripped in the previous steps such that the outer jacket 226 terminates at a shoulder 136 (see FIGS. 8-11) of the housing 39. The shoulder 136 is located at the distal ends of tabs 58 and at the proximate ends of strength member receivers 120 and the central passage 118. The tabs 58, therefore, cover the end of the outer jacket 226 when the cover 41 and the body 36 are connected. When the cover 41 and the body 36 are pressed together, the teeth 130 of the tabs 58 are pressed into or against the outer jacket 226. The teeth 130 are oriented to resist movement of the outer jacket 226 in the proximal direction away from the body 36. Therefore, the teeth 130 provide further connection means to hold the fiber optic cable firmly engaged with the connector housing 39.

After the cover 41 has been connected with the body 36 and fiber optic cable 20, the crimp band 38 is slid over a part of the connector housing 39 and crimped in place to hold the cover 41 securely onto the body 36. The sealing tube 106 is then slid over a portion of the crimp band 38 so as to cover the end of the cable 20, the proximal end of the connector housing 39 and at least a portion of the crimp band 38. Heat is then applied to the sealing tube 106 to cause the sealing tube 106 to shrink and tightly form around the adjacent portions of the connector housing 39, the crimp band 38, and the fiber optic cable 20, to seal connector from foreign substances. The coupling nut 40 is then slid over the crimp band 38, the sealing tube 106 and the connector housing 39. The boot 42 is then slid onto the first connector 32 and over the sealing tube 106. The boot 42 is, for example, a flexible polymeric/rubber material. At the distal end of the boot 42, the boot 42 can include a structure (e.g., an inwardly projecting flange or lip) that provides a mechanical interlock with the recessed portion 128 of the tabs 58. Although the tabs 58 are spaced from the boot 42 by the sealing tube 106, the sealing tube 106 fits tightly around the tabs 58, such that the recessed portion 128 of the tabs 58 can be engaged by the boot 42. The sealing member 49 is then mounted with the groove 112 about the connector housing 39 to complete the installation of connector 32 onto fiber optic cable 20. The boot 42 retains the coupling nut 40 on the connector housing 39.

Referring to FIGS. 1, 2, 5 and 12, the adapter 34 of the fiber optic connection system 30 includes an outer housing 44 having a first housing piece 45 that interconnects with a second housing piece 47. The first housing piece 45 defines a first end 70 of the outer housing 44 at which the first port 35 is located. The second housing piece 47 defines a second end 72 of the outer housing 44 at which the second port 37 is located. An adapter assembly 140 mounts within the outer housing 44. The adapter 34 also includes a mounting ring or nut 46 that mounts around the exterior of the outer housing 44.

The first housing piece 45 of the adapter 34 includes a first region 60 separated from a second region 62 by a shoulder 64. The first and second regions 60, 62 have generally cylindrical outer shapes and the shoulder 64 provides a diameter reduction from the first region 60 to the second region 62. The second region 62 defines external threads 66 located adjacent the shoulder 64. The external threads 66 are sized to mate with corresponding internal threads 68 of the mounting nut 46 such that the mounting nut 46 can be threaded on the second region 62 of the first housing piece 45. The second region 62 also includes a pair of oppositely positioned latches 167 for use in securing the first housing piece 45 to the second housing piece 47. Each of the latches 167 includes a flexible cantilever arm 170 having a base end integrally formed with the second region 62. Each cantilever arm 170 defines an opening 172 adapted to receive a corresponding retention tab 174 of the second housing piece 47 when the first and second housing pieces 45, 47 are connected together.

Figure 12:
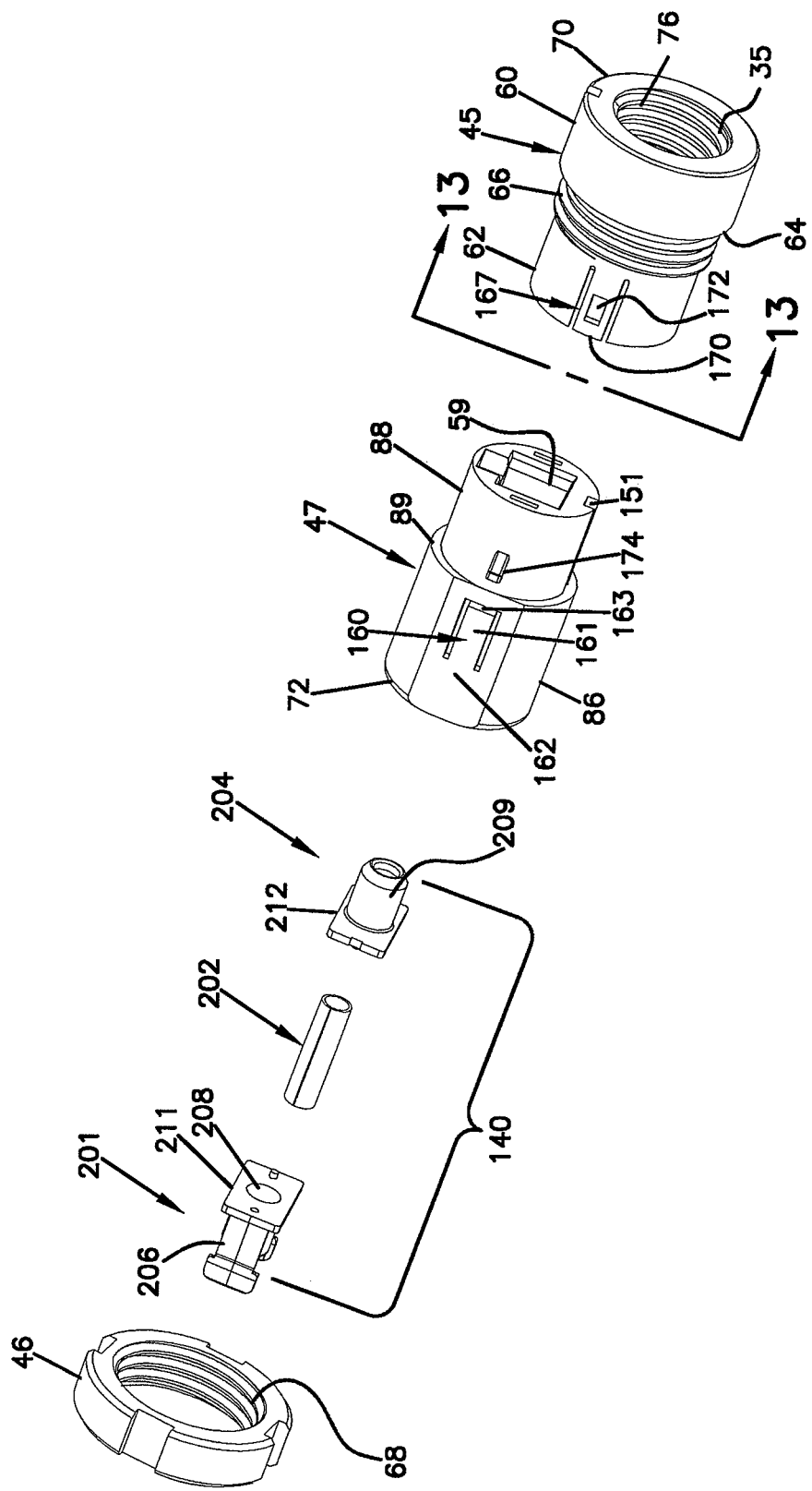
FIG. 12 is an exploded, perspective view of a fiber optic adapter of the fiber optic connection system of FIG. 1.

Referring to FIG. 12, the first region 60 defines the first port 35 of the adapter 34. Internal threads 76 are provided within the first region 60 adjacent the first end 70 of the housing 44. The internal threads 76 within the first port 35 are sized to threadingly receive the exterior screw threads 75 of the coupling nut 40 when the coupling nut is threaded into the first port 35 to provide a secure connection between the first connector 32 and the adapter 34.

Referring now to FIGS. 17 and 19, the first housing piece 45 defines an annular sealing surface 78 positioned inside the first housing piece 45 at a location adjacent to the internal threads 76. An angled diameter transition 79 decreases the internal diameter of the first port 35 from the internal threads 76 to the annular sealing surface 78. The annular sealing surface 78 is preferably generally cylindrical and is adapted to engage the sealing member 49 of the first connector 32 when the first connector 32 is fully inserted within the first port 35. The interface between the annular sealing surface 78 and the sealing member 49 provides an internal environmental seal between the first connector 32 and the adapter 34.

Figure 13:
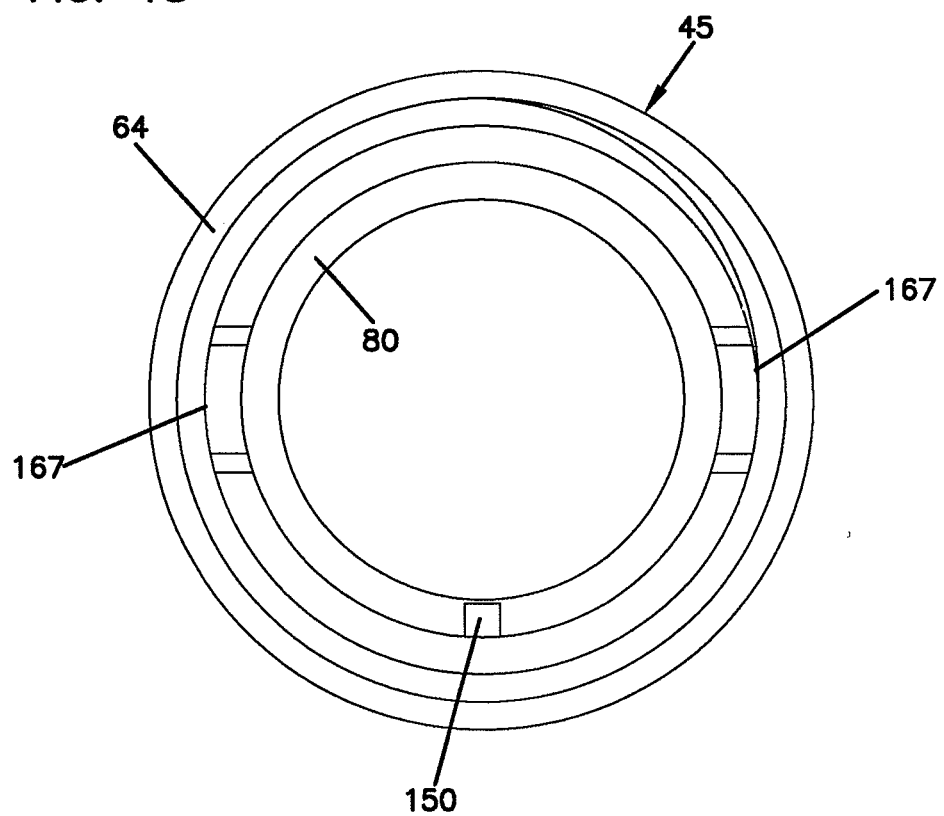
FIG. 13 is a view taken along section line 13-13 of FIG. 12.

Referring still to FIGS. 17 and 19, the first housing piece 45 defines an internal pocket 80 within the second region 62 for receiving an end portion of the second housing piece 47 when the housing pieces 45, 47 are interconnected. The pocket 80 is separated from the annular sealing surface 78 by a shoulder 84 that provides an increase in diameter from the annular sealing surface 78 to the pocket 80. As shown at FIG. 13, a keying member 150 (e.g., a tab or a rail) is provided at the pocket 80 for ensuring proper rotational alignment between the first housing piece 45 and the second housing piece 47. The keying member 150 is received within a corresponding keyway 151 defined by the second housing piece 47 when the first and second housing pieces 45, 47 are interconnected together.

The second housing piece 47 of the adapter 34 includes a first region 86 separated from a second region 88 by a shoulder 89. The first and second regions 86 and 88 each have generally cylindrical outer shapes. The shoulder 89 provides a reduction in outer diameter from the first region 86 to the second region 88. The retention tabs 174 for interconnecting the first housing piece 45 with the second housing piece 47 are provided at the second region 88.

The first region 86 of the second housing piece 47 includes a pair of oppositely positioned latches 160 for securing the adapter assembly 140 within the second housing piece 47. As shown at FIGS. 12 and 17, each of the latches 160 includes a flexible cantilever arm 161 having a base end 162 integrally formed with the second housing piece 47, and a free end 163 positioned opposite from the base end 162. Retention tabs 164 are provided at the free ends 163. The retention tabs 164 include angled surfaces 166 that angle toward the central axis of the adapter 34, and retention surfaces 168 that are generally transversely aligned relative to the central axis of the adapter 34. The first region 86 of the second housing piece 47 can also include a keying slot 169 (see FIG. 3) for receiving a corresponding rail 165 of the second connector 33 to ensure that the second connector 33 is inserted into the second port 37 at the proper rotational orientation.

The second region 88 of the second housing piece 47 defines the first plug receptacle 59 for receiving the plug portion 56 of the first connector 32 when the first connector is inserted into the first adapter port 35. As previously described, the first plug receptacle 59 has a tapered portion defined by opposite surfaces 67, 69 that converge towards one another as the surfaces extend toward the second end 72 of the adapter 34. The tapered configuration of the first plug receptacle 59 and the plug portion 56 of the first connector 32 facilitates maintaining precise alignment of the first connector 32 within the adapter 34. The first region 86 of the second housing piece 47 also defines a second plug receptacle 97 corresponding to the second adapter port 37. The second plug receptacle 97 is adapted for receiving the second connector 33.

The adapter assembly 140 of the adapter 34 includes a connector retention clip 201, a split sleeve 202, and a backing piece 204. The split sleeve 202 is adapted for receiving the ferrules of the first and second connectors 32, 33 when the connectors are inserted into the adapter 34 to maintain alignment between the fibers 222 of the connectors 32, 33. The connector retention clip 201 includes a pair of latching arms 206 that interlock with the second connector 33 when the second connector is inserted within the second port 37 of the adapter 34. In this manner, the latching arms 206 retain second connector 33 within the second port 37. The connector retention clip 201 also includes a cylindrical receptacle 208 for receiving one end of the split sleeve 202. The other end of the split sleeve is received within a cylindrical receptacle 209 of the backing piece 204. In this manner, the split sleeve 202 is captured between the retention clip 201 and the backing piece 204. Flanges 211, 212 of the retention clip 201 and the backing piece 204 are secured together to retain the split sleeve 202 between the retention clip 201 and the backing piece 204. When the split sleeve 202 is mounted between the retention clip 201 and the backing piece 204, the split sleeve 202 has a limited amount of space available for sliding axially within the cylindrical receptacles 208, 209. However, this limited space does allow for the split sleeve 202 to float within the cylindrical receptacles 208, 209 in order to provide proper alignment between the ferrules 100 of the connectors 32, 33.

The assembled adapter assembly 140 is loaded into the second housing piece 47 by inserting the adapter assembly 140 into the second plug receptacle 97 through the second adapter port 37. As the adapter assembly 140 is inserted into the second plug receptacle 97, the flanges 211, 212 of the adapter assembly engage the angled surfaces 166 of the cantilever arms 161 causing the cantilever arms to flex outwardly. After the flanges 211, 212 have been pressed past the angled surfaces 166, the cantilever arms 161 snap radially inwardly and retention surfaces 168 of the retention tabs 164 capture and retain the adapter assembly 140 within the second housing piece 47 (see FIG. 17). As so positioned, the retention clip end of the adapter assembly 140 is accessible from the second port 37 of the adapter 34 and the backing piece end of the adapter assembly 140 is accessible from the first port 35 of the adapter 34. The flanges 211, 212 are captured between the retention surfaces 168 of the retention tabs 164 and a shoulder 213 of the second housing piece 47. The cylindrical receptacle 208 of the retention clip 201 is positioned within the second plug receptacle 97 and the cylindrical receptacle 209 of the backing piece 204 is located within the first plug receptacle 59. The split sleeve 202 is aligned generally along the central axis of the adapter 34. In the depicted embodiment, the adapter does not include structure (e.g., a spring or other biasing or resilient structure) for facilitating allowing the adapter assembly 140 to float within the outer housing 44. Instead, the retention tabs 164 prevent the adapter assembly 140 from floating or otherwise moving within the outer housing 44. However, as indicated above, there is a limited amount of space between the split sleeve 202, which is disposed within the adapter assembly 140, and the cylindrical receptacles 208, 209 that allows for the split sleeve to float within the cylindrical receptacles 208, 209.

After the adapter assembly 140 has been snapped within the second housing piece 47 of the outer housing 44, the first and second housing pieces 45, 47 are connected together. For example, the second region 88 of the second housing piece 47 is inserted into the pocket 80 defined within the second region 62 of the first housing piece 45. During insertion, rotational alignment is ensured by inserting the keying member 150 of the first housing piece 45 into the keyway 151 of the second housing piece 47. As the second housing piece 47 is inserted into the first housing piece 45, the cantilever arms 170 engage the retention tabs 174 causing the cantilever arms 170 to flex radially outwardly. When the openings 172 of the cantilever arms 170 align with the retention tabs 174, the cantilever arms snap radially inwardly to a locked position in which the retention tabs 174 protrude through the openings 172.

The adapter 34 is adapted to be mounted within an opening defined by a wall of the enclosure 19. To mount the adapter 34 in the opening, the mounting nut 46 is first removed. The second end of the outer housing 44 is then inserted from the exterior of the enclosure through the mounting opening until the shoulder 64 abuts against the outside surface of the enclosure wall. Thereafter, the mounting nut 46 is threaded on the threads 66 until the nut abuts against the inside surface of the enclosure wall. With the enclosure wall captured between the shoulder 64 and the mounting nut 46, the adapter 34 is securely mounted to the enclosure.

As indicated above, the adapter 34 is configured for providing an optical connection between the first connector 32 and the second connector 33. To provide this connection, the first connector 32 is mounted in the first port 35 and the second connector 33 is mounted in the second adapter port 37. To mount the first connector 32 in the first adapter port 35, the first connector 32 is inserted axially into the port 35 until the plug portion 56 fits within the first plug receptacle 59 and the latch 50 snaps within the notch 82. As so positioned, the ferrule 100 fits within one end of the split sleeve 202 and the sealing member 49 engages the annular sealing surface 78. The connection is finalized by threading the coupling nut 40 into the internal threads 76 of the adapter 34 until an end surface 115 (shown in FIGS. 7 and 17) of the coupling nut 40 abuts the circumferential shoulder 113 of the connector housing 39, thereby retaining the connector housing 39 against the second region 88 of the second housing piece 47 of the adapter 34 (as shown in FIG. 17). The second connector 33 is mounted in the second adapter port 37 by inserting the connector axially into the port 37 until the connector 33 is snapped between the arms 206 of the connector retention clip 201. As so positioned, a ferrule 230 of the connector 33 is received within the other end of the split sleeve 202 such that the ferrules 230, 100 are held in axial alignment with one another.

The fiber optic connection system 30 preferably has a compact configuration adapted to provide relatively high circuit densities. In one embodiment, the diameter D1 of the sealing member 49 (see FIG. 7) and the diameter D2 of the annular sealing surface 78 (see FIG. 17) each are less than or equal to 15 mm. In an alternate embodiment, the diameter D1 of the sealing member 49 and the diameter D2 of the annular sealing surface 78 each are less than or equal to 12.5 mm. In another embodiment, the diameter D1 of the sealing member 49 and the diameter D2 of the annular sealing surface 78 each are less than 10 mm.

FIGS. 20-23 depict another fiber optic connection system 330 having features that are examples of inventive aspects in accordance with the principles of the present disclosure. The system includes a first connector 332 and an adapter 334 for optically connecting the first connector 332 to another connector. The structure of the fiber optic connection system has the same general configuration as the system 30 of FIGS. 1-22 except that the connector 332 includes multi-termination ferrule 301 (e.g., a ferrule with more that one fiber mounted therein) and the adapter 334 is adapter for connecting a first multi-termination connector to a second multi-termination connector. The multi-termination ferrule 301 has a generally rectangular configuration, and the adapter 334 includes generally rectangular multi-termination ferrule receptacles for accommodating multi-termination ferrules.

From the forgoing detailed description, it will be evident that modifications and variations can be made in the devices of the disclosure without departing from the spirit or scope of the invention.

What is claimed is:

1. A hardened fiber optic connector for optically coupling to a mating fiber optic connector through a fiber optic adapter, the fiber optic connector comprising:
   a connector housing;
   a ferrule assembly at least partially mounted within the connector housing, the ferrule assembly including a ferrule for holding at least one optical fiber of a cable, a distal end of the ferrule extending distally beyond a distal end of the connector housing;
   a coupling nut installed over the connector housing, the coupling nut being rotatable relative to the connector housing to retain the connector housing within an adapter; and
   a sealing member mounted around the connector housing, the sealing member having a diameter less than or equal to 15 millimeters, and the sealing member being mounted between the ferrule assembly and a proximal end of the connector housing.

2. The hardened fiber optic connector of claim 1, wherein the connector housing is configured to receive one or more strength members of the cable.

3. The hardened fiber optic connector of claim 2, further comprising:
   a crimp band for securing the one or more strength members on the connector housing.

4. The hardened fiber optic connector of claim 1, further comprising:
   a strain relief boot mounted adjacent the proximal end of the connector housing.

5. A hardened optical fiber connector, comprising:
   a connector housing;
   a ferrule assembly at least partially mounted within the connector housing, the ferrule assembly including a ferrule for holding at least one optical fiber of a cable;
   a rotatable coupling member installed over the connector housing, the rotatable coupling member being rotatable relative to the connector housing to retain the connector housing within an adapter; and
   a sealing member mounted around the connector housing, the sealing member having a diameter less than or equal to 15 millimeters, and the sealing member being mounted between the ferrule assembly and a proximal end of the connector housing.

6. The hardened optical fiber connector of claim 5, wherein a distal end of the ferrule extends distally beyond a distal end of the connector housing.

7. The hardened optical fiber connector of claim 5, wherein the diameter of the sealing member is less than or equal to 12.5 millimeters.

8. The hardened optical fiber connector of claim 5, wherein the diameter of the sealing member is less than 10 millimeters.

9. The hardened optical fiber connector of claim 5, wherein the connector housing is configured to receive one or more strength members of the cable.

10. The hardened optical fiber connector of claim 9, further comprising:
    a crimp band for securing the one or more strength members on the connector housing.

11. The hardened optical fiber connector of claim 5, further comprising:
    a strain relief boot mounted adjacent the proximal end of the connector housing.

12. The hardened optical fiber connector of claim 5, wherein the sealing member is mounted between a plug portion of the connector housing and the rotatable coupling member.

13. The hardened optical fiber connector of claim 5, wherein the rotatable coupling member includes threads.

14. A hardened optical fiber connector, comprising:
    a connector housing;
    a ferrule assembly at least partially mounted within the connector housing, the ferrule assembly including a ferrule for holding at least one optical fiber of a cable; and
    a sealing member mounted around the connector housing, the sealing member having a diameter less than or equal to 15 millimeters, and the sealing member being mounted between the ferrule assembly and a proximal end of the connector housing.

15. The hardened optical fiber connector of claim 14, wherein a distal end of the ferrule extends distally beyond a distal end of the connector housing.

16. The hardened optical fiber connector of claim 14, wherein the diameter of the sealing member is less than or equal to 12.5 millimeters.

17. The hardened optical fiber connector of claim 14, wherein the diameter of the sealing member is less than 10 millimeters.

18. The hardened optical fiber connector of claim 14, wherein the connector housing is configured to receive one or more strength members of the cable.

19. The hardened optical fiber connector of claim 18, further comprising:
    a crimp band for securing the one or more strength members on the connector housing.

20. The hardened optical fiber connector of claim 14, further comprising:
    a strain relief boot mounted adjacent the proximal end of the connector housing and a rotatable coupling member installed over the connector housing in front of the strain relief boot.

* * * * *